US011622356B2

(12) United States Patent
Abedini et al.

(10) Patent No.: US 11,622,356 B2
(45) Date of Patent: Apr. 4, 2023

(54) RESOURCE CONFIGURATION MANAGEMENT IN WIRELESS COMMUNICATIONS

(71) Applicant: QUALCOMM Incorporated, San Diego, CA (US)

(72) Inventors: Navid Abedini, Somerset, NJ (US); Jianghong Luo, Skillman, NJ (US); Luca Blessent, Whitehouse Station, NJ (US); Karl Georg Hampel, Hoboken, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/942,497

(22) Filed: Jul. 29, 2020

(65) Prior Publication Data

US 2021/0037531 A1    Feb. 4, 2021

Related U.S. Application Data

(60) Provisional application No. 62/880,471, filed on Jul. 30, 2019.

(51) Int. Cl.
*H04W 72/04*    (2009.01)
*H04W 52/02*    (2009.01)
(Continued)

(52) U.S. Cl.
CPC ... *H04W 72/0493* (2013.01); *H04W 52/0274* (2013.01); *H04W 72/046* (2013.01);
(Continued)

(58) Field of Classification Search
CPC ....... H04L 5/16; H04L 5/1476; H04L 5/1469; H04W 72/12; H04W 72/1205;
(Continued)

(56) References Cited

U.S. PATENT DOCUMENTS

| 2019/0045489 | A1* | 2/2019 | He   | H04W 72/12 |
| 2020/0252847 | A1* | 8/2020 | Park | H04W 88/14 |

(Continued)

FOREIGN PATENT DOCUMENTS

WO    WO-2019141356 A1    7/2019

OTHER PUBLICATIONS (Qualcomm Incorporated: "Resource Management in IAB Network", 3GPP Draft; R1-1813419, 3rd Generation Partnership Project (3GPP)), Nov. 2018.*

(Continued)

*Primary Examiner* — Lakeram Jangbahadur
(74) *Attorney, Agent, or Firm* — Holland & Hart LLP

(57) ABSTRACT

Methods, systems, and devices for wireless communications are described in which multiple different wireless resource configurations for a multiple-hop wireless network may be configured and selected to provide for efficient updates to resource configurations. A central entity may configure one or more other nodes of the network with a number of different wireless resource configurations for backhaul communications among the other nodes. A first node may receive the number of different wireless resource configurations, identify wireless resources associated with a first resource configuration that are allocated for backhaul communications, and communicate with a second node using the allocated resources. In the event that the first node determines that a different wireless resource configuration should be used for communications with the second node, the first node may select a second resource configuration from the number of different wireless resource configurations for further communications with the second node.

30 Claims, 14 Drawing Sheets

(51) Int. Cl.
H04W 72/044 (2023.01)
H04W 72/1263 (2023.01)
H04W 80/02 (2009.01)
H04W 84/18 (2009.01)

(52) U.S. Cl.
CPC ....... H04W 72/1263 (2013.01); H04W 80/02 (2013.01); H04W 84/18 (2013.01)

(58) Field of Classification Search
CPC .............. H04W 72/1278; H04W 88/04; H04W 72/0446; H04W 84/047
See application file for complete search history.

(56) References Cited

U.S. PATENT DOCUMENTS

| 2020/0260328 | A1* | 8/2020 | Lee | H04W 28/0278 |
| 2021/0036765 | A1* | 2/2021 | Keskitalo | H04B 7/15542 |
| 2021/0153189 | A1* | 5/2021 | Jo | H04W 72/0453 |

OTHER PUBLICATIONS (Qualcomm Incorporated: "Updated IAB Resource Management Framework", 3GPP Draft; R1-1907267, 3rd Generation Partnership Project (3GPP)), May 2019.*

3GPP419 (Qualcomm, Resource Management in IAB Network, R1-1813419, Nov. 2018).*

International Search Report and Written Opinion—PCT/US2020/044170—ISA/EPO—dated Oct. 30, 2020.

Qualcomm Incorporated: "Resource Management in IAB Network", 3GPP Draft, 3GPP TSG RAN WG1 Meeting #95, R1-1813419, 3rd Generation Partnership Project (3GPP), Mobile Competence Centre, 650, Route Des Lucioles, F-06921 Sophia-Antipolis Cedex, France, vol. RAN WG1, No. Spokane, US, Nov. 12, 2018-Nov. 16, 2018, Nov. 11, 2018 (Nov. 11, 2018), XP051555458, 8 Pages, Retrieved from the Internet: URL: http://www.3gpp.org/ftp/Meetings%5F3GPP%5FSYNC/RAN1/Docs/R1%2D1813419%2Ezip. [retrieved on Nov. 11, 2018] the whole document,p. 2, "Observation 1", and preceding paragraph.

Qualcomm Incorporated: "Updated IAB Resource Management Framework," 3GPP Draft, 3GPP TSG RAN WG1 Meeting #97, R1-1907267, 3rd Generation Partnership Project (3GPP), Mobile Competence Centre, 650, Route Des Lucioles, F-06921, Sophia-Antipolis Cedex, France, vol. RAN WG1, No. Reno, USA; May 13, 2019-May 17, 2019, May 13, 2019 (May 13, 2019), XP051728707, 7 pages, Retrieved from the Internet: URL: http://www.3gpp.org/ftp/Meetings%5F3GPP%5FSYNC/RAN1/Docs/R1%2D1907267%2Ezip [retrieved on May 13, 2019] p. 2, last paragraph.

ETSI Technical Specification 138 214, V15.3.0, 3GPP, "3rd Generation Partnership Project, 5G; NR; Physical Layer Procedures for Data (3GPP TS 38.214 version 15.3.0 Release 15)", Oct. 2018, pp. 1-99.

* cited by examiner

RESOURCE CONFIGURATION MANAGEMENT IN WIRELESS COMMUNICATIONS

CROSS REFERENCE

The present application for patent claims the benefit of U.S. Provisional Patent Application No. 62/880,471 by ABEDINI et al., entitled "RESOURCE CONFIGURATION MANAGEMENT IN WIRELESS COMMUNICATIONS," filed Jul. 30, 2019, assigned to the assignee hereof, and expressly incorporated by reference herein.

BACKGROUND

The following relates generally to wireless communications, and more specifically to resource configuration management in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems (e.g., 5G new radio (NR) systems), infrastructure and spectral resources for NR access may additionally support wireless backhaul link capabilities in supplement to wireline backhaul connections, providing an integrated access and backhaul (IAB) network architecture. One or more base stations may include centralized units (CUs) and distributed units (DUs) and may be referred to as donor base stations. One or more DUs associated with a donor base station may be partially controlled by CUs associated with a donor base station. The one or more donor base stations (e.g., IAB donors) may be in communication with one or more additional base stations (e.g., IAB nodes) via supported access and backhaul links. IAB nodes may support mobile terminal (MT) functionality controlled and/or scheduled by DUs of a coupled IAB donor, as well as DUs relative to additional entities (e.g., IAB nodes, UEs, etc.) within the relay chain or configuration of the access network (e.g., downstream). Wireless resources for backhaul links and for access links may be configured by a CU, and one or more IAB nodes provide access links and backhaul links in accordance with the resource configuration. Efficient techniques for allocating wireless resources in such networks may be desired.

SUMMARY

The described techniques relate to improved methods, systems, devices, and apparatuses that support resource configuration management in wireless communications. According to various aspects, wireless resource configurations for a multiple-hop wireless network (e.g., an integrated access and backhaul (IAB) network) may be configured and selected to provide for efficient updates to resource configurations based on current network conditions. In some cases, a central entity (e.g., a central unit (CU) of an IAB network) may configure one or more other nodes of the network with a number of different wireless resource configurations for backhaul communications among the other nodes. In some cases, a first node (e.g., an IAB relay node, parent node, child node, etc.) may receive the number of different wireless resource configurations, identify wireless resources associated with a first resource configuration (e.g., time resources, frequency resources, spatial resources, etc.) that are allocated for backhaul communications, and communicate with a second node (e.g., an IAB relay node, parent node, child node, etc.) using the allocated resources. In the event that the first node determines that a different wireless resource configuration should be used for communications with the second node, the first node may select a second resource configuration from the number of different wireless resource configurations for further communications with the second node. In some cases, the first node may provide an indication of the second resource configuration to the second node and, optionally, to the central entity.

A method of wireless communication is described. The method may include identifying, at a first node of a multiple-hop wireless network, a first preconfigured resource allocation of a set of preconfigured resource allocations of wireless resources that are available for communications between the first node and one or more of a parent node or a child node, selecting, after using the first preconfigured resource allocation, a second preconfigured resource allocation of the set of preconfigured resource allocations for communications with one or more of the parent node or the child node, and communicating with one or more of the parent node or the child node using the second preconfigured resource allocation.

An apparatus for wireless communication is described. The apparatus may include a processor, memory coupled with the processor, and instructions stored in the memory. The instructions may be executable by the processor to cause the apparatus to identify, at a first node of a multiple-hop wireless network, a first preconfigured resource allocation of a set of preconfigured resource allocations of wireless resources that are available for communications between the first node and one or more of a parent node or a child node, select, after using the first preconfigured resource allocation, a second preconfigured resource allocation of the set of preconfigured resource allocations for communications with one or more of the parent node or the child node, and communicate with one or more of the parent node or the child node using the second preconfigured resource allocation.

Another apparatus for wireless communication is described. The apparatus may include means for identifying, at a first node of a multiple-hop wireless network, a first preconfigured resource allocation of a set of preconfigured resource allocations of wireless resources that are available for communications between the first node and one or more of a parent node or a child node, selecting, after using the first preconfigured resource allocation, a second preconfigured resource allocation of the set of preconfigured resource allocations for communications with one or more of the parent node or the child node, and communicating with one or more of the parent node or the child node using the second preconfigured resource allocation.

A non-transitory computer-readable medium storing code for wireless communication is described. The code may include instructions executable by a processor to identify, at a first node of a multiple-hop wireless network, a first preconfigured resource allocation of a set of preconfigured resource allocations of wireless resources that are available for communications between the first node and one or more of a parent node or a child node, select, after using the first preconfigured resource allocation, a second preconfigured resource allocation of the set of preconfigured resource allocations for communications with one or more of the parent node or the child node, and communicate with one or more of the parent node or the child node using the second preconfigured resource allocation.

Some examples of the method, apparatuses, and non-transitory computer-readable medium described herein may further include operations, features, means, or instructions for receiving, from a central entity of the multiple-hop wireless network, configuration information that indicates each of the set of preconfigured resource allocations that may be available to the first node for communications with one or more parent nodes or child nodes. In some examples of the method, apparatuses, and non-transitory computer-readable medium described herein, the identifying the first preconfigured resource allocation may include operations, features, means, or instructions for receiving, from the central entity, an initial configuration that indicates the first preconfigured resource allocation are to be used for initial communications with one or more of the parent node or the child node. In some examples of the method, apparatuses, and non-transitory computer-readable medium described herein, the first preconfigured resource allocation may be a default resource allocation that may be provided in the configuration information.

In some examples of the method, apparatuses, and non-transitory computer-readable medium described herein, the selecting the second preconfigured resource allocation may be based on receiving, from a central entity of the multiple-hop wireless network, an indication to change to the second preconfigured resource allocation. Some examples of the method, apparatuses, and non-transitory computer-readable medium described herein may further include operations, features, means, or instructions for transmitting an indication that the second preconfigured resource allocation has been selected for communications of the first node to one or more of the parent node, the child node, or a central entity of the multiple-hop wireless network.

Some examples of the method, apparatuses, and non-transitory computer-readable medium described herein may further include operations, features, means, or instructions for receiving, from one or more of the parent node or the child node, an indication of an updated resource allocation at the parent node or the child node, and where the selecting the second preconfigured resource allocation may be based on the updated resource allocation. In some examples of the method, apparatuses, and non-transitory computer-readable medium described herein, the indication may be received in a downlink control information transmission, an uplink control information transmission, in a medium access control (MAC) control element (CE), or any combinations thereof.

In some examples of the method, apparatuses, and non-transitory computer-readable medium described herein, the first node may be a first child node and the indication of the updated resource allocation may be received from a first parent node, and where the second preconfigured resource allocation may be selected based on a mapping of a subset of the set of preconfigured resource allocations that is compatible with the updated resource allocation of the first parent node.

In some examples of the method, apparatuses, and non-transitory computer-readable medium described herein, the mapping of the subset of the set of preconfigured resource allocations that are compatible with the updated resource allocation of the first parent node may be explicitly indicated in configuration information that configures the set of preconfigured resource allocations or determined based on one or more mapping rules. In some examples of the method, apparatuses, and non-transitory computer-readable medium described herein, the indication of the updated resource allocation further indicates that the first node is to select the second preconfigured resource allocation.

In some examples of the method, apparatuses, and non-transitory computer-readable medium described herein, the first node may be a first parent node and the indication of the updated resource allocation may be received from a first child node, and where the indication of the updated resource allocation may be a request from the first child node to use the updated resource allocation. In some examples of the method, apparatuses, and non-transitory computer-readable medium described herein, the first node transmits a response to the first child node that the request is granted and that indicates the second preconfigured resource allocation of the first node.

Some examples of the method, apparatuses, and non-transitory computer-readable medium described herein may further include operations, features, means, or instructions for determining that one or more preconfigured criteria for switching preconfigured resource allocations have been met, and where the selecting the second preconfigured resource allocation is based on the one or more preconfigured criteria. In some examples of the method, apparatuses, and non-transitory computer-readable medium described herein, the one or more preconfigured criteria may be received in configuration information from a central entity of the multiple-hop wireless network.

In some examples of the method, apparatuses, and non-transitory computer-readable medium described herein, the one or more preconfigured criteria may be based on a beam that is used for communications between the first node and one or more of the parent node or the child node, and where the first preconfigured resource allocation is associated with a first beam and the second preconfigured resource allocation is associated with a second beam. In some examples of the method, apparatuses, and non-transitory computer-readable medium described herein, the first preconfigured resource allocation and the second preconfigured resource allocation are associated with different multiplexing parameters of the associated first beam and second beam.

In some examples of the method, apparatuses, and non-transitory computer-readable medium described herein, the one or more preconfigured criteria may be based on a power saving mode that is used for communications between the first node and one or more of the parent node or the child node, and where the first preconfigured resource allocation is associated with a first power saving mode and the second preconfigured resource allocation is associated with a second power saving mode. In some examples of the method, apparatuses, and non-transitory computer-readable medium described herein, the one or more preconfigured criteria may be based on a topological state of one or more of the first node, the parent node, or the child node, and where the first preconfigured resource allocation is associated with a first topological state and the second preconfigured resource allocation is associated with a second topological state. In some examples of the method, apparatuses, and non-transitory computer-readable medium described herein, the one or more preconfigured criteria may be based on a quality of service associated with communications between the first node and one or more of the parent node or the child node, and where the first preconfigured resource allocation is associated with a first quality of service and the second preconfigured resource allocation is associated with a second quality of service.

A method of wireless communication is described. The method may include configuring, by a central entity of a multiple-hop wireless network, a first node of the multiple-hop wireless network with a set of preconfigured resource allocations, where each of the set of preconfigured resource allocations indicates different wireless resources that are available for communications between the first node and one or more of other nodes and providing the first node with the set of preconfigured resource allocations.

An apparatus for wireless communication is described. The apparatus may include a processor, memory coupled with the processor, and instructions stored in the memory. The instructions may be executable by the processor to cause the apparatus to configure, by a central entity of a multiple-hop wireless network, a first node of the multiple-hop wireless network with a set of preconfigured resource allocations, where each of the set of preconfigured resource allocations indicates different wireless resources that are available for communications between the first node and one or more of other nodes and provide the first node with the set of preconfigured resource allocations.

Another apparatus for wireless communication is described. The apparatus may include means for configuring, by a central entity of a multiple-hop wireless network, a first node of the multiple-hop wireless network with a set of preconfigured resource allocations, where each of the set of preconfigured resource allocations indicates different wireless resources that are available for communications between the first node and one or more of other nodes and providing the first node with the set of preconfigured resource allocations.

A non-transitory computer-readable medium storing code for wireless communication is described. The code may include instructions executable by a processor to configure, by a central entity of a multiple-hop wireless network, a first node of the multiple-hop wireless network with a set of preconfigured resource allocations, where each of the set of preconfigured resource allocations indicates different wireless resources that are available for communications between the first node and one or more of other nodes and provide the first node with the set of preconfigured resource allocations.

Some examples of the method, apparatuses, and non-transitory computer-readable medium described herein may further include operations, features, means, or instructions for providing an initial configuration to the first node that indicates a first preconfigured resource allocation of the set of preconfigured resource allocations is to be used for initial communications with one or more of the other nodes. In some examples of the method, apparatuses, and non-transitory computer-readable medium described herein, the first preconfigured resource allocation may be a default resource allocation that is provided in configuration information that is provided to the first node.

Some examples of the method, apparatuses, and non-transitory computer-readable medium described herein may further include operations, features, means, or instructions for determining that a second preconfigured resource allocation is to be used for the further communications with one or more of the other nodes, and providing an indication to the first node to change to the second preconfigured resource allocation. Some examples of the method, apparatuses, and non-transitory computer-readable medium described herein may further include operations, features, means, or instructions for receiving an indication of acknowledgment from the first node.

In some examples of the method, apparatuses, and non-transitory computer-readable medium described herein, the determining that the second preconfigured resource allocation is to be used for the further communications with one or more of the other nodes may be based on one or more preconfigured criteria for switching preconfigured resource allocations. In some examples of the method, apparatuses, and non-transitory computer-readable medium described herein, the one or more preconfigured criteria may be based on a beam that is used for communications with one or more of the other nodes, and where the first preconfigured resource allocation is associated with a first beam and the second preconfigured resource allocation is associated with a second beam. In some examples of the method, apparatuses, and non-transitory computer-readable medium described herein, the first preconfigured resource allocation and the second preconfigured resource allocation may be associated with different multiplexing parameters of beams used for communications with one or more of the other nodes.

In some examples of the method, apparatuses, and non-transitory computer-readable medium described herein, the one or more preconfigured criteria may be based on a power saving mode that may be used for communications with one or more of the other nodes, and where the first preconfigured resource allocation is associated with a first power saving mode and the second preconfigured resource allocation is associated with a second power saving mode. In some examples of the method, apparatuses, and non-transitory computer-readable medium described herein, the one or more preconfigured criteria may be based on a topological state of at least one of the first node or one or more of the other nodes, and where the first preconfigured resource allocation is associated with a first topological state and the second preconfigured resource allocation is associated with a second topological state. In some examples of the method, apparatuses, and non-transitory computer-readable medium described herein, the one or more preconfigured criteria may be based on a quality of service associated with communications between the first node and one or more of the other nodes, and where the first preconfigured resource allocation is associated with a first quality of service and the second preconfigured resource allocation is associated with a second quality of service. Some examples of the method, apparatuses, and non-transitory computer-readable medium described herein may further include operations, features, means, or instructions for receiving an indication from the first node that a second preconfigured resource allocation of the set of preconfigured resource allocations is to be used for further communications with one or more of the other nodes.

DETAILED DESCRIPTION

Figure 1:
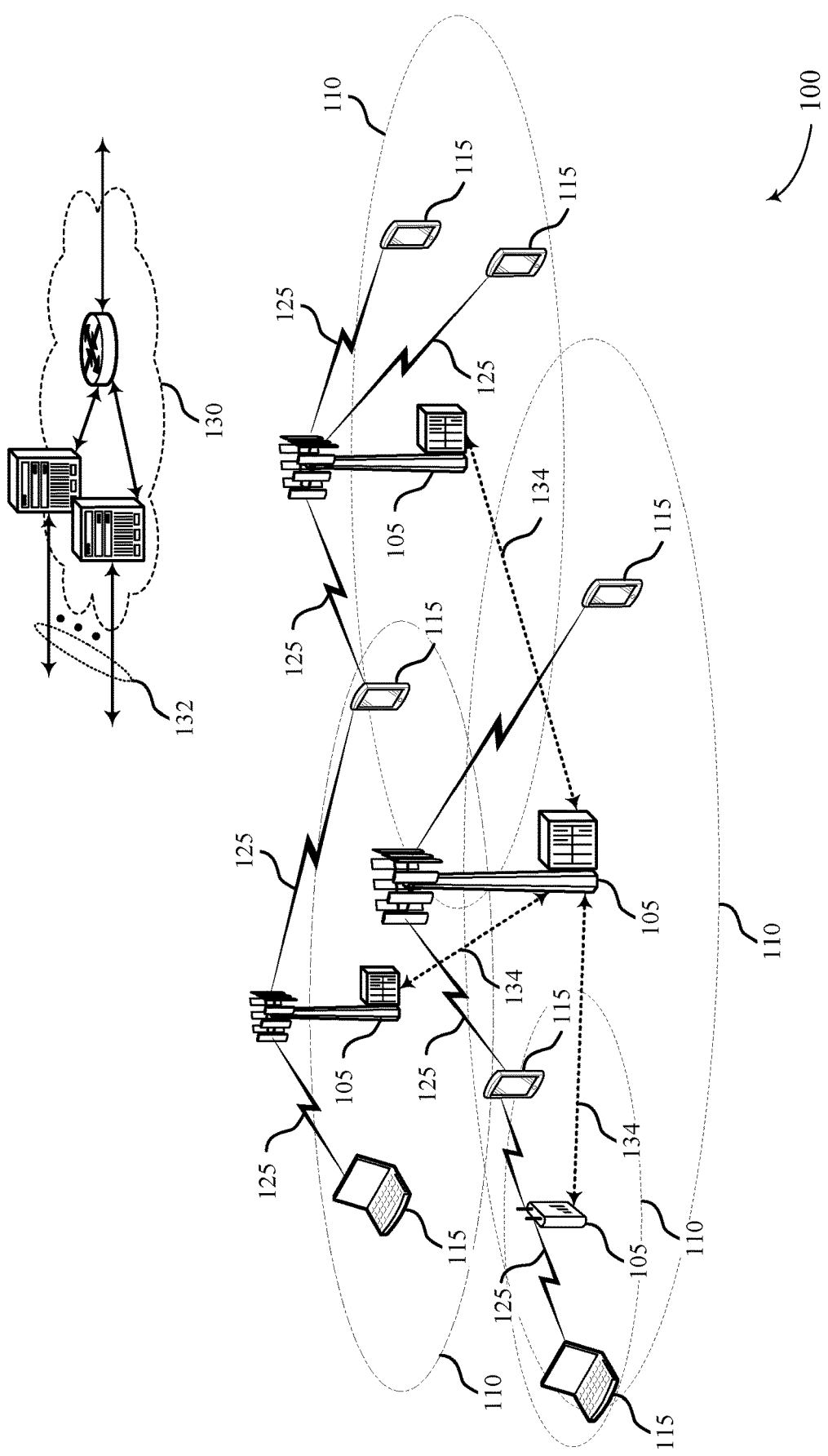
FIG. 1 illustrates an example of a system for wireless communications that supports resource configuration management in wireless communications in accordance with aspects of the present disclosure.

In some wireless communications systems (e.g., 5G new radio (NR) systems), infrastructure and spectral resources for NR access may support wireless backhaul link capabilities in supplement to wireline backhaul connections, providing an integrated access and backhaul (IAB) network architecture. One or more base stations may include centralized units (CUs) and distributed units (DUs) and may be referred to as donor base stations (e.g., or IAB donors). One or more DUs associated with a donor base station may be partially controlled by CUs associated with the donor base station. A base station CU may be a component of a database, data center, core network, or network cloud. A network node associated with a radio access technology (RAT) may communicate with a donor base station CU via a backhaul link (e.g., wireline backhaul or wireless backhaul). The one or more donor base stations (e.g., IAB donors) may be in communication with one or more additional base stations (e.g., IAB nodes or relay nodes) and user equipment (UEs). IAB nodes may support mobile terminal (MT) functionality controlled and scheduled by an IAB donor and/or parent IAB nodes relative to the MT supported IAB nodes, as well as DU operability relative to additional entities (e.g., IAB nodes, UEs, etc.) within the relay chain or configuration of the access network (e.g., downstream). For example, an IAB network architecture may include a chain of connected wireless devices (e.g., starting with a donor base station and ending with a user equipment (UE), with any number of IAB relay nodes in between) via link resources that support NR access and backhaul capabilities (e.g., a wireline backhaul or wireless backhaul). While various examples provided herein illustrate and discuss IAB deployments, it is to be understood that the techniques provided herein may be applied to any multiple-hop wireless network in which a central entity may configure other wireless nodes (e.g., parent nodes, child nodes, etc.) for relayed or multi-hop wireless communications.

A relay node may refer to an intermediary node in a relay (e.g., an IAB relay) chain. For example, a relay node may relay communications between a parent node (e.g., an IAB donor, or an IAB node upstream or higher on the relay chain) and a child node (e.g., an IAB node downstream or lower on the relay chain). In some cases, the relay node may refer to the DU or access node function (AN-F) of an intermediary IAB node. A child node may refer to an IAB-Node (e.g., the CU/MT of the IAB-Node) or a UE that is the child of another IAB-Node (e.g., such as the relay node) or an IAB-donor (e.g., the DU/ANF of the IAB-Node or IAB-Donor). A parent node in communication with the relay node may refer to an upstream IAB-Node or an IAB-donor (e.g., the DU/ANF of the IAB-Node or IAB-Donor).

The IAB network architecture may support increased backhaul density within the relay chain, to compensate for mobile capacity density within the one or more service cells corresponding to base stations (e.g., IAB donors, IAB nodes) supported on the network. For example, several IAB nodes may each be in communication with one or more UEs, the IAB nodes controlled and scheduled by one or more DUs via backhaul links. In some cases, a single backhaul connection may support multiple RATs and aid in improving spectral gains.

Such multiple-hop networks may thus use wireless resources (time/frequency resources, spatial resources, etc.) in a shared manner between access links and backhaul links. In some cases, wireless nodes may communicate according to a resource configuration that defines resources that are to be used for access links and backhaul links. Such resource configurations may be managed by a central entity in the wireless network. In some systems, a central entity may semi-statically configure other wireless nodes of the network with resource configurations. For example, a CU in a NR IAB network may provide IAB nodes with a resource configuration via radio resource control (RRC) signaling. The resource configuration may include different types of resources that provide some flexibility to the configured node, such as by providing some resources (e.g., SOFT resources) that can be managed locally and dynamically (e.g., if a parent nodes does not need its allocated (e.g., HARD) resources, it may lend them to its child node). However, in some cases network conditions may change such that, even with some flexibility with SOFT/HARD resources, a resource configuration is relatively inefficient for a connection. Further, updating the resource configuration in such instances is relatively slow and incurs relatively high resource overhead, through the exchange of RRC signaling to provide the new configuration.

Various techniques provided herein provide for enhanced efficiency and reduced overhead that may allow for updated resource configurations based on network conditions. In some cases, a central entity may configure a set of available resource configurations at one or more nodes of a multiple-hop wireless network. The nodes may then select a particular resource configuration for further communications. In some cases, the central entity may configure an initial or default resource allocation, which may be updated as needed when network conditions change (e.g., based on changed traffic characteristics, changed channel conditions, etc.) to another resource configuration of the set of available resource configurations. In some cases, the central entity may provide an explicit indication to switch resource configurations. In other cases, a node may update the resource configuration without an explicit indication from the central entity, and may optionally inform the central entity of an updated configuration. In some cases, a wireless node may determine a new instance of resource configuration is to be used based on an indication from one or more parent node(s) (e.g., in downlink control information (DCI), a medium access control (MAC) control element (CE), or any combinations thereof), from one or more child node(s) (e.g., in uplink control information (UCI), MAC-CE, or any combinations thereof), based on some preconfigured criteria, or any combinations thereof. Upon changing the instance of the resource configuration at a wireless node, a notification may be provided to one or more of a parent node, child node, central entity, or any combinations thereof.

Thus, the techniques described herein provide for enhanced efficiency and reliability in a wireless network through selection and updating of resource configurations relatively quickly and with relatively low signaling overhead. Such techniques may provide enhanced network capacity by using wireless resources in an efficient manner, and also reduce network overhead through selection of preconfigured resource configurations with relatively little or no overhead signaling that would otherwise be used to provide an updated configuration (e.g., RRC signaling to provide a new resource configuration). Additionally, such techniques may provide enhanced reliability of a network through selection of resource configurations that can adapt to changing network conditions in an efficient and prompt manner.

Aspects of the disclosure are initially described in the context of exemplary wireless communications systems. Aspects of the disclosure are further illustrated by and described with reference to apparatus diagrams, system diagrams, and flowcharts that relate to resource configuration management in wireless communications.

FIG. 1 illustrates an example of a wireless communications system 100 that supports resource configuration management in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications systems 100 may support wireless backhaul communications, and one or more base stations 105 may include CUs and DUs, where one or more DUs associated with a base station 105 may be partially controlled by a CU associated with the base station 105. The base station CUs may be a component of a database, data center, or the core network 130 (e.g., a 5G NR core network (5GC)). A base station CU may communicate with a donor base station 105 via a backhaul link 132 (e.g., a wireline backhaul or a wireless backhaul). As another example, in IAB networks, a base station CU (e.g., a donor base station 105-*a*) may communicate with the core network 130 (e.g., the NGC) via a backhaul link 132 (e.g., a wireline backhaul or wireless backhaul). The donor base station 105 may be referred to, for example in an IAB network, as an IAB donor and may be in communication with one or more IAB nodes (e.g., other base stations 105) operating as base station DUs relative to the IAB donor and one or more UEs. For example, an IAB network may include a chain of wireless devices (e.g., starting with the donor base station 105 (a RAN node that terminates an interface with the core network) and ending with a UE 115, with any number of IAB nodes in between). IAB nodes (e.g., relay nodes) may support MT functionality (which may also be referred to as UE function (UE-F)) controlled and scheduled by an IAB donor, or another IAB node, as its parent node as well as DU functionality (which may also be referred to as an access node function (AN-F)) relative to additional entities (e.g., IAB nodes, UEs, etc.) within the relay chain or configuration of the access network (e.g., downstream). These relay mechanisms may forward traffic along to the additional entities, extend the range of wireless access for one or more base stations, enhance the density of backhaul capability within serving cells 110, etc.

In some cases, wireless resource configurations for a multiple-hop wireless network (e.g., an integrated access and backhaul (IAB) network) may be configured and selected to provide for efficient updates to resource configurations based on current network conditions. In some cases, a CU may configure one or more other nodes of the network with a number of different wireless resource configurations for backhaul communications among the other nodes. In some cases, a first node (e.g., an IAB relay node, parent node, child node, etc., at a base station 105) may receive the number of different wireless resource configurations, identify wireless resources associated with a first resource configuration (e.g., time resources, frequency resources, spatial resources, etc.) that are allocated for backhaul communications, and communicate with a second node (e.g., an IAB relay node, parent node, child node, etc., at a base station 105) using the allocated resources. In the event that the first node determines that a different wireless resource configuration should be used for communications with the second node, the first node may select a second resource configuration from the number of different wireless resource configurations for further communications with the second node. In some cases, the first node may provide an indication of the second resource configuration to the second node and, optionally, to the CU.

Figure 2:
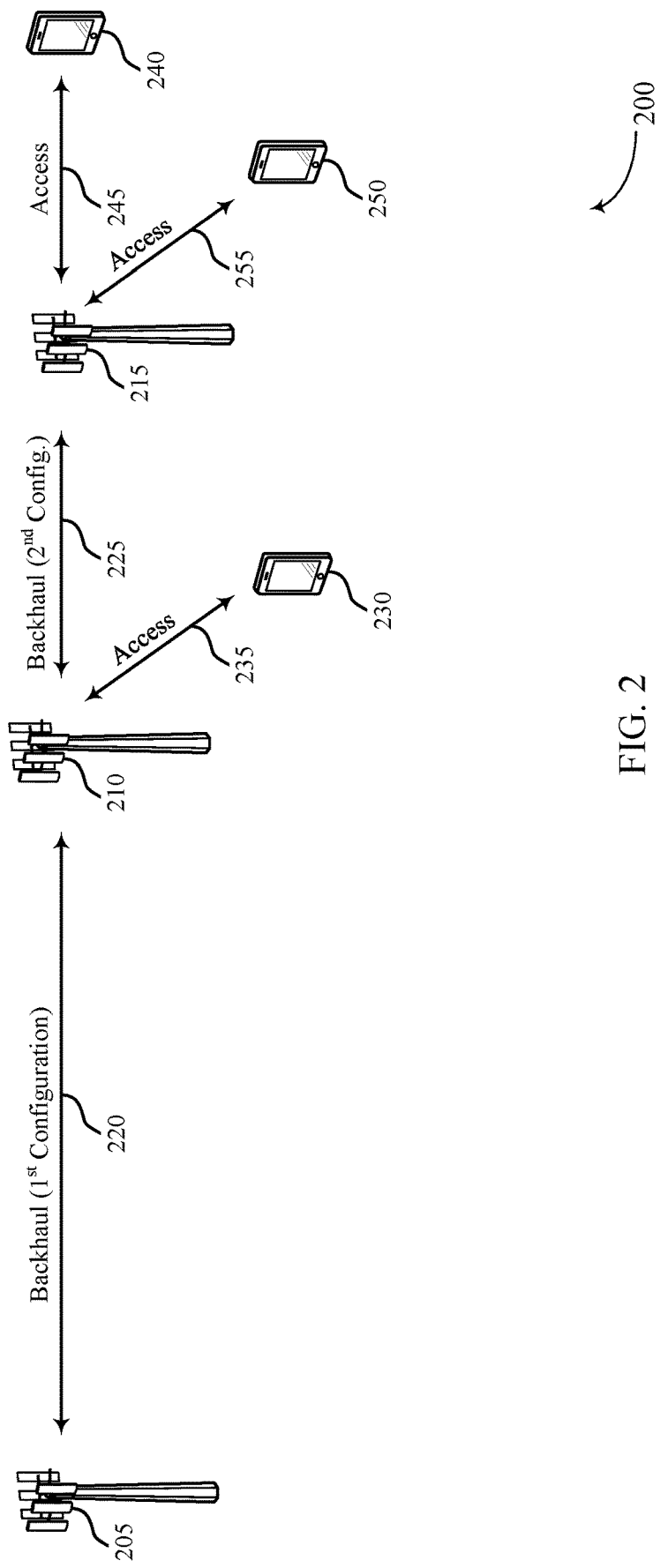
FIG. 2 illustrates an example of a portion of a wireless communications system that supports resource configuration management in wireless communications in accordance with aspects of the present disclosure.

FIG. 2 illustrates an example of a multi-hop wireless communications system 200 that supports resource configuration management in wireless communications in accordance with aspects of the present disclosure. In some examples, multi-hop wireless communications system 200 may implement aspects of wireless communications system 100. Wireless communication system 200 may include base stations 205, 210, and 215, and UEs 230, 240, and 250, which may be examples of corresponding devices described herein. In some aspects, wireless communication system 200 may operate over a mmW radio frequency spectrum band. In some aspects, any of the base stations 205, 210, 215 and/or UEs 230, 240, 250, may implement aspects of the described techniques over a licensed radio frequency spectrum band and/or a shared or unlicensed radio frequency spectrum band.

In some aspects, multi-hop wireless communications system 200 may be an example of an IAB network. For example, base stations 205, 210, and 215 may be nodes within an IAB network. Accordingly, base station 205 may communicate over backhaul link 220 with base station 210, and vice versa (e.g., using a first wireless resource configuration). Base station 210 may communicate with base station 215 over backhaul link 225 (e.g., using a second resource configuration) and/or with UE 230 over access link 235, or vice versa. Base station 215 may communicate with UE 240 over access link 245 and/or with UE 250 over access link 255, or vice versa.

As discussed, various aspects of the present disclosure describe techniques that enable support for wireless communications according to one of a number of preconfigured resource configurations. For example, a central entity (e.g., an entity at the base station 205 or in a core network) may manage resource configurations used for the backhaul links 220, 225, and access links 235, 245, 255. In some cases, the central entity may semi-statically configure other wireless nodes of the network (e.g., wireless nodes as base stations 205, 210, 215) with a number of available resource configurations. For example, a CU in an IAB network may provide IAB nodes with a set of available resource configurations via RRC signaling as part of an initial configuration or an updated configuration of the multi-hop wireless communications system 200. The wireless nodes may then select a particular resource configuration for communications based on current network conditions.

In some cases, the central entity may configure an initial or default resource allocation, which may be updated as needed when network conditions change (e.g., based on changed traffic characteristics, changed channel conditions, etc.) to another resource configuration of the set of available resource configurations. In some cases, the central entity may provide an explicit indication to switch resource configurations. In other cases, a wireless node may update the resource configuration without an explicit indication from the central entity, and may optionally inform the central entity of an updated configuration. In some cases, a wireless node may determine a new instance of resource configuration is to be used based on an indication from one or more parent node(s) (e.g., in DCI, a MAC-CE, or any combinations thereof), from one or more child node(s) (e.g., in UCI, MAC-CE, or any combinations thereof), based on some preconfigured criteria, or any combinations thereof.

Upon changing the instance of the resource configuration at a wireless node, a notification may be provided to one or more of a parent node, child node, central entity, or any combinations thereof. For example, a child node (e.g., an IAB relay node) operating at base station 210 may receive an indication from a parent node (e.g., an IAB donor node) operating at base station 205 that indicates the parent node has adopted a new instance or wireless resource configuration from the set of preconfigured resource configurations. The parent node may transmit an indication of the updated resource configuration in the event that the configuration is changed. The child node, in some cases, may map the indicated parent resource configuration to one or multiple instances of preconfigured wireless resources that are in the set of preconfigured wireless configurations that are at the child node. For example, the parent node may indicate that a configuration that uses a certain slot pattern (e.g., even numbered slots) has been selected for backhaul communications with the parent node, and a mapping may be provided that indicates one or more child node configurations that are compatible with that slot pattern (e.g., a configuration that uses odd slots for child node communications with a downstream node such as base station 215). Based on the mapping, the child node may determine an instance of the set of preconfigured resource configurations from the down-selected list for use at the child node. In some cases, such relationships or mapping may be explicitly configured or indicated to the child node (e.g. by a CU), or may be implicitly be inferred by the child node based on one or more rules (e.g., finding a complying resource configuration instance in terms of available/not-available resources and/or uplink/downlink directions). In some cases, the parent node may be aware (e.g., based on an indication from the central entity) about the child node resource configuration instances, and may select and indicate one such instance to the child node.

In some cases, the central entity may provide an indication to another node that a resource configuration is to be updated. In other cases, a wireless node (e.g., a parent node at base station 210) may adopt a new instance from the list preconfigured resource configurations without an explicit indication. In some cases, an updated resource configuration may be selected by a parent node based on an indication from one or more child nodes (e.g., a child node at base station 215). For example, the child node may send information to the parent node to indicate its own resource configuration (and when/if it changes its configuration), or a request to change its configuration. The parent node, responsive to the indication from the child node, may in return change its own resource. Further, in some cases, the parent node may provide an indication (e.g., response to child node request, or indication of its own changed configuration) to the child node.

In some cases, a wireless node (e.g., a parent node at base station 210) may determine that an updated resource configuration is to be selected based on one or more criteria (e.g., one or more preconfigured criteria that may be standardized or provided by a central entity or parent node for selecting or changing an instance of its resource configuration). For example, a parent node may select a resource configuration based on a transmission beam that is used for communications. In such an example, based on the serving beam over a backhaul link with another parent node or donor node, the resources used for communication with one or more child node(s) may be selected. Such techniques may be used when mmW communications are employed for backhaul links, which may use multiplexing techniques (e.g., spatial multiplexing, frequency multiplexing, time multiplexing, or combinations thereof) that may be dependent upon beams used at the parent/child nodes (e.g., when beams need a certain level of spatial separation). In such cases, when a parent node indicates a beam over the backhaul link changes, the child node may autonomously change (and provide an indication of) its resource configuration for its associated child node link(s).

Additionally or alternatively, in cases where resource configurations are updated based on preconfigured criteria, one or more rules can be defined (e.g., in a network specification or configuration provided by a central entity or parent node) for selecting or changing a resource configuration instance. For example, the choice of resource configuration may dependent on a power-saving mode employed for backhaul communications. In such cases, when a parent or child node changes power saving mode, upstream or downstream nodes may autonomously update their associated resource configuration (e.g., with our without providing an indication to a central entity). In other cases, the choice of resource configuration may depend on a topological state of a node (e.g., a hop-level, number of child links, number of parents, etc.). Additionally or alternatively, the choice of resource configuration may depend on a traffic or service type being supported by a node (e.g., when there is an active session for high priority traffic such as ultra-reliable low latency communication (URLLC) traffic, the resource configuration could be different to improve the latency, reliability, or both).

Upon selection of an updated resource configuration, the parent node(s), child node(s), and central entity may communicate according to the selected resource configuration until such a time that the resource configuration may again be updated. Thus, such techniques allow for efficient updates to resource allocations based on network conditions and with relatively low signaling overhead, which may enhance overall network efficiency and reliability.

Figure 3:
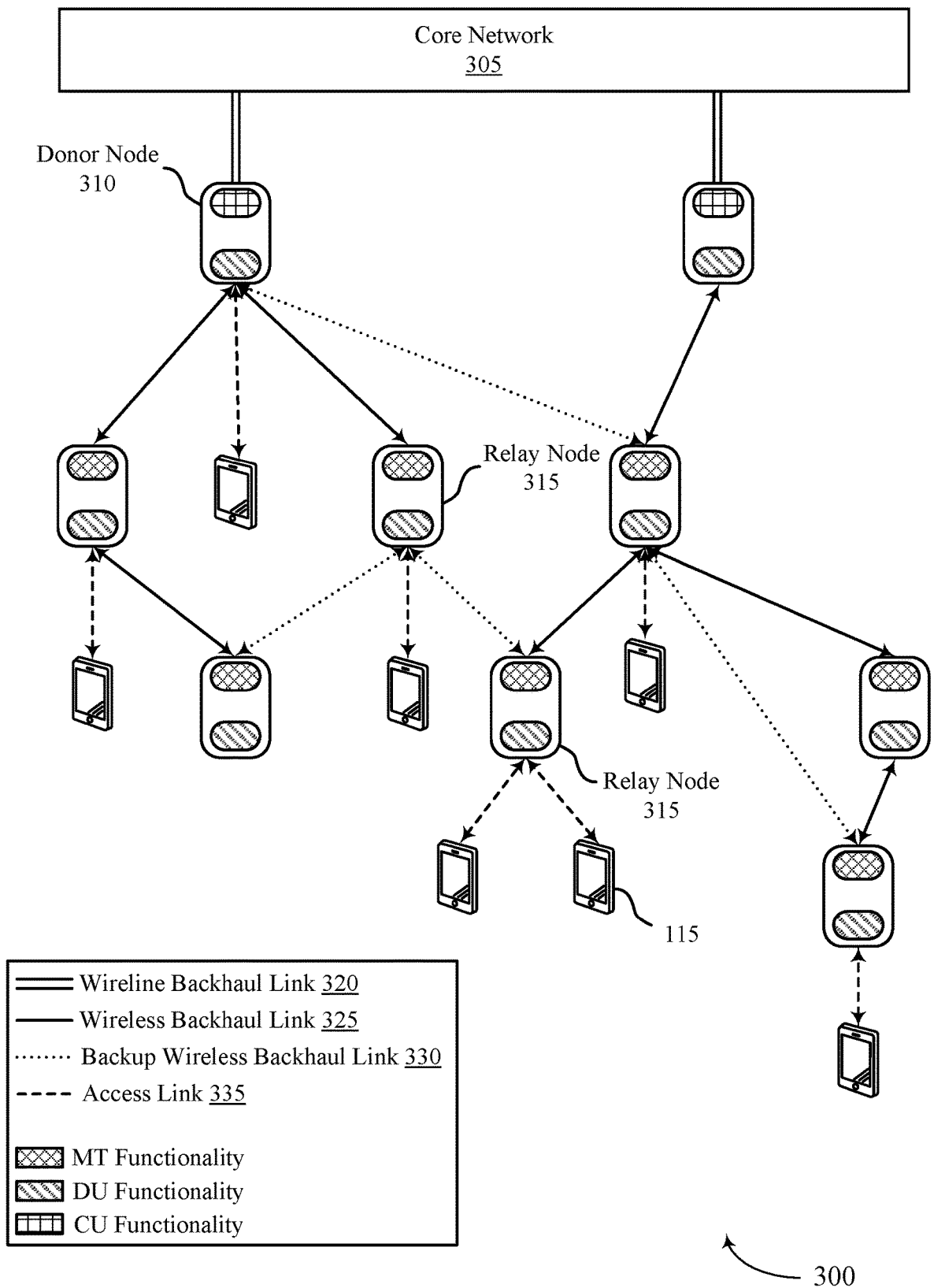
FIG. 3 illustrates an example of an IAB network in a wireless communications system that supports resource configuration management in wireless communications in accordance with aspects of the present disclosure.

As indicated herein, in some cases resource configuration techniques may be employed in any type of multi-hop wireless network, which may include an IAB network. FIG. 3 illustrates an example of a IAB network in a wireless communications system 300 that supports resource configuration management in wireless communications in accordance with aspects of the present disclosure. In some examples, wireless communications system 300 may implement aspects of wireless communications system 100 or 200. Wireless communications system 300 (e.g., an NR system, a mmW system, etc.) may supplement wireline backhaul connections (e.g., wireline backhaul links 320) by sharing infrastructure and spectral resources for network access with wireless backhaul link capabilities, providing an IAB network architecture.

Wireless communications system 300 may include a core network 305 and base stations (e.g., base stations 105, 205, 210, 215, of FIGS. 1 and 2) or supported devices split into one or more support entities (i.e., functionalities) for promoting wireless backhaul density in collaboration with communication access. Aspects of the supporting functionalities of the base stations may be referred to as IAB nodes, such as IAB donor nodes 310 and IAB relay nodes 315. Wireless communications system 300 may additionally support a number of UEs 115, which may communicate on the uplink with one or more IAB donor nodes 310, IAB relay nodes 315, or a combination of these devices.

Wireless communications system 300 may include one or more IAB donor nodes 310, which may interface between a wireline network and a wireless network. In some cases, an IAB donor node 310 may be referred to as an anchor node, as the IAB donor node 310 anchors the wireless network to a wireline connection. For example, each IAB donor node 310 may include at least one wireline backhaul link 320 and one or more additional links (e.g., wireless backhaul links 325, backup wireless backhaul links 330, access links 335, etc.). An IAB donor node 310 may be split into associated base station central unit (CU) and distributed unit (DU) entities, where one or more DUs associated with an IAB donor node 310 may be partially controlled by an associated CU. CUs of IAB donor nodes 310 may host layer 3 (L3) (e.g., RRC, service data adaption protocol (SDAP), PDCP, etc.) functionality and signaling. Further, CUs of IAB donor nodes 310 may communicate with the core network 305 over a wireline backhaul link 320 (e.g., which may be referred to as an NG interface). DUs may host lower layer operations, such as layer 1 (L1) or layer 3 (L2) (e.g., RLC, MAC, physical layer, etc.) functionality and signaling. A DU entity of an IAB donor node 310 may support a serving cell within the network coverage area according to connections associated with wireless backhaul links 325 and access links 335 of the IAB network. DUs of the IAB donor nodes 310 may control both access and backhaul links within the corresponding network coverage and may provide controlling and scheduling for descendant (i.e., child) IAB relay nodes 315 and or UEs 115. For example, a DU may support an RLC channel connection with a UE 115 (e.g., via an access link 335) or with an IAB relay node 315 (e.g., via a backhaul link, such as a primary wireless backhaul link 325 or a backup wireless backhaul link 330).

IAB relay nodes 315 may be split into associated mobile terminal (MT) and base station DU entities, where MT functionality of the IAB relay nodes 315 may be controlled or scheduled by antecedent (i.e., parent) IAB nodes via wireless backhaul links. A parent node to an IAB relay node 315 may be another (antecedent) IAB relay node 315 or a donor node 310. The MT functionality may be similar to functionality performed by UEs 115 in the system. An IAB relay node 315 may not be directly connected to a wireline backhaul 320. Instead, the IAB relay node 315 may connect to the core network 305 via other IAB nodes (e.g., any number of additional IAB relay nodes 315 and an IAB donor node 310) using wireless backhaul links. The IAB relay node 315 may transmit upstream (e.g., towards the core network 305) in the IAB system using MT functionality. In some cases, DUs of the IAB relay nodes 315 may be partially controlled by signaling messages from CU entities of an associated IAB donor node 310 (e.g., transmitted via an F1-application protocol (AP)). The DUs of the IAB relay nodes 315 may support serving cells of the network coverage area. For example, a DU of an IAB relay node 315 may perform the same or similar functions as a DU of an IAB donor node 310, supporting one or more access links 335 for UEs 115, one or more wireless backhaul links for downstream IAB relay nodes 315, or both.

Wireless communications system 300 may employ relay chains for communications within the IAB network architecture. For example, a UE 115 may communicate with an IAB node, and the IAB node may relay the data to a base station CU or the core network 305 either directly or via one or more IAB relay nodes 315. Each IAB relay node 315 may include a primary wireless backhaul link 325 for relaying data upstream or receiving information from a base station CU or the core network 305. In some cases, an IAB relay node 315 may additionally include one or more backup wireless backhaul links 330 (e.g., for redundant connectivity or improved robustness). If the primary wireless backhaul link 325 fails (e.g., due to interference, malfunction at a connected IAB node, movement of IAB nodes, maintenance at IAB nodes, etc.), an IAB relay node 315 may utilize a backup wireless backhaul link 330 for backhaul communication within the IAB network. The first (e.g., primary) wireless backhaul link 325 may be associated with a coverage area and MT functionality may be controlled or scheduled by a first parent node. The one or more secondary backhaul links (e.g., backup wireless backhaul links 330) may be associated with a non-collocated coverage area and controlled or scheduled by one or more parent nodes. Each of the primary backhaul connections and the one or more secondary connections may support spectral capabilities to provide network communication over one or more RATs. The one or more IAB nodes may further support base station DU entities and may support multiple backhaul and access links within the relay chain. The DU entities may control or schedule descendant IAB relay nodes 315 and UEs 115 within the IAB network (e.g., downstream in the IAB network) via the configured backhaul and access links. That is, an IAB relay node 315 may act as a relay between an IAB donor node 310 and one or more descendant devices (e.g., other IAB relay nodes 315, UEs 115, etc.) in both communication directions based on established backhaul and access connections.

In some cases, the wireless communications system 300 may support preconfigured wireless resource configurations and dynamic selections thereof in accordance with techniques discussed herein. In some cases, a CU may configure one or more other nodes of the network with a number of different wireless resource configurations for backhaul communications among the other nodes. In some cases, a CU may configure each of the nodes (e.g., donor nodes 310, relay nodes 315) with the number of different wireless resource configurations (which may be a same set of configurations for each node, or may be different sets of configurations for different nodes). Each node may identify wireless resources associated with a first resource configuration (e.g., time resources, frequency resources, spatial resources, etc.) that are allocated for backhaul communications, and communicate with a second node using the allocated resources. In the event that a node determines that a different wireless resource configuration should be used for communications it may select a second resource configuration from the number of different wireless resource configurations for further communications in accordance with techniques such as discussed with reference to FIGS. 1 and 2.

Figure 4:
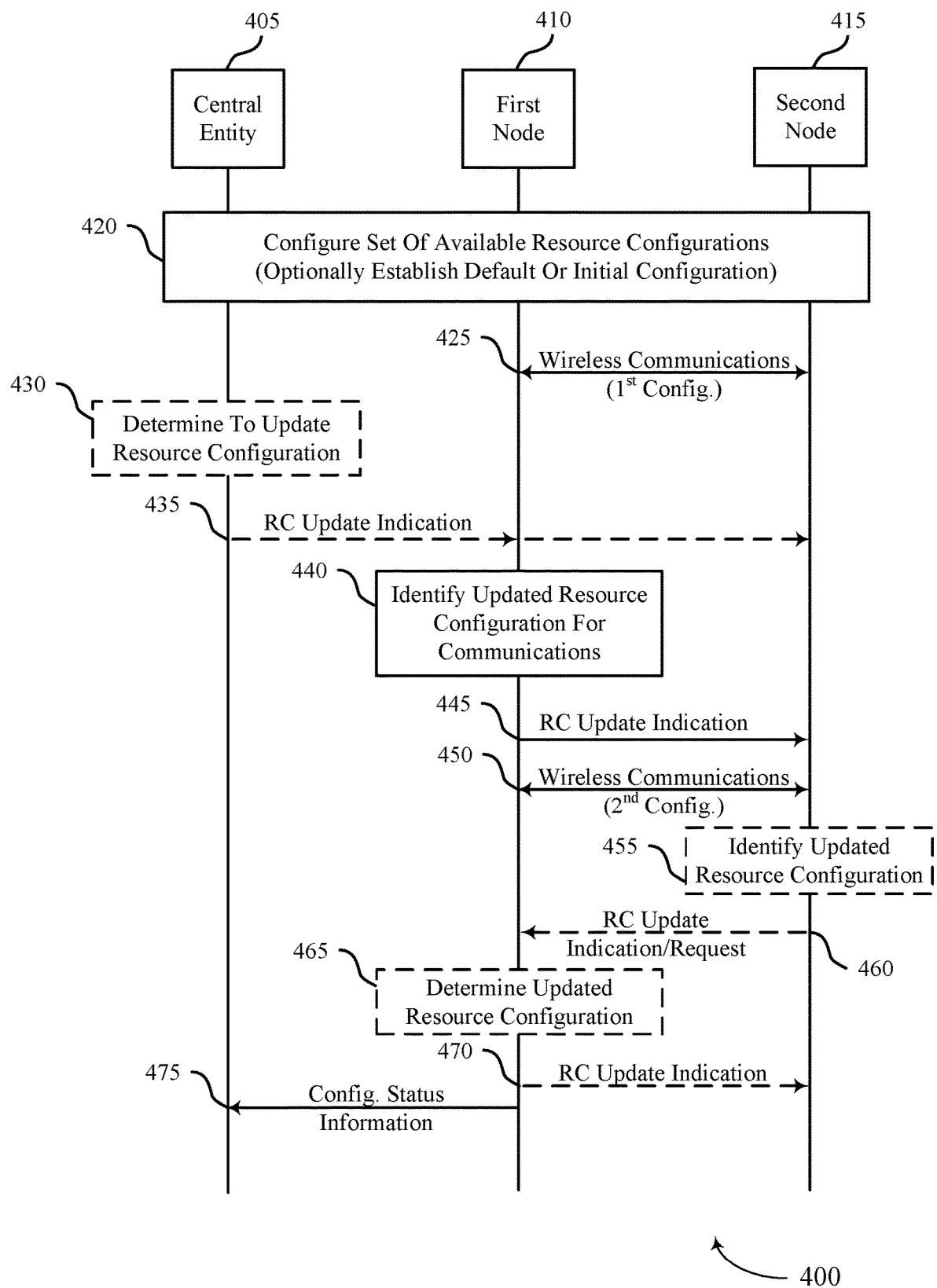
FIG. 4 illustrates an example of a process flow that supports resource configuration management in wireless communications in accordance with aspects of the present disclosure.

FIG. 4 illustrates an example of a process flow 400 that supports resource configuration management in wireless communications in accordance with aspects of the present disclosure. In some examples, process flow 400 may implement aspects of wireless communications system 100, 200, or 300. Process flow 400 may include one or more nodes that may include a central entity 405, a first node 410, and a second node 415, which may be examples of supporting functionality within base stations of a multi-hop wireless network architecture, as described with reference to FIGS. 1 through 3. In the following description of the process flow 400, the operations between the nodes 405, 410, 415, may be transmitted in a different order than the exemplary order shown, or the operations performed by the nodes may be performed in different orders or at different times. In some cases, certain operations may also be left out of the process flow 400, or other operations may be added to the process flow 400.

In this example, at 420, the central entity 405 (e.g., a CU of an IAB network) may configure the first node 410 (e.g., a parent node or donor node of an IAB network) and the second node 415 (e.g., a child node of an IAB network) with a set of available resource configurations for multi-hop communications (e.g., backhaul communications between nodes). The set of available resource configurations may provide wireless resource allocations that are to be used for communications between the nodes. In some case, the central entity 405 may optionally provide an initial configuration or default configuration that is to be used for initial communications. At 425, the first node 410 and the second node 415 may exchange wireless communications (e.g., backhaul communications, relayed access link communications in the multi-hop network, etc.) according to a first configuration of the set of available resource configurations.

Optionally, at 430, the central entity 405 may determine to update the resource configuration used by one or more of the first node 410 or second node 415. In such cases, at 435, the central entity 405 may transmit a resource configuration update indication to one or both of the first node 410 or second node 415. In some cases, the central entity 405 may determine to update the resource configuration based on one or more network conditions, such as a type or priority of traffic being exchanged, one or more changes in network topology (e.g., due to other relay nodes coming online or going offline), beam updates, power saving mode, and the like.

At 440, the first node 410 may identify an updated resource configuration for communications with the second node 415. In cases where the first node 410 receives an update indication from the central entity 405, such an identification may be based on the received indication. In other cases, the first node 410 may identify the updated resource configuration based on one or more operating conditions or other configuration changes of the first node 410, as discussed herein. At 445, the first node 410 may transmit a resource configuration update indication to the second node 415 (e.g., in DCI or in a MAC-CE transmission to the second node 415). Based on the updated configuration, the first node 410 and the second node 415 may, at 450, exchange wireless communications (e.g., backhaul communications, relayed access link communications in the multi-hop network, etc.) according to a second configuration of the set of available resource configurations that is indicated in the resource configuration update indication.

Optionally, at 455, the second node 415 may identify an updated resource configuration. In some cases, the second node 415 may be a child node and may identify the updated resource configuration based on one or more operating conditions or other configuration changes of the second node 415, as discussed herein. In such cases, at 460, the second node 415 may transmit a resource configuration update or request indication to the first node 410 (e.g., in UCI or in a MAC-CE transmission). In some cases, the first node 410, based on the update or request indication, may determine an updated resource configuration. At 470, the first node 410 may transmit a responsive resource configuration indication or request grant indication to the second node 415, following which the first node 410 and second node 415 may communicate according to a third configuration. In some cases, at 475, the first node 410 may provide a configuration status indication to the central entity.

Figure 5:
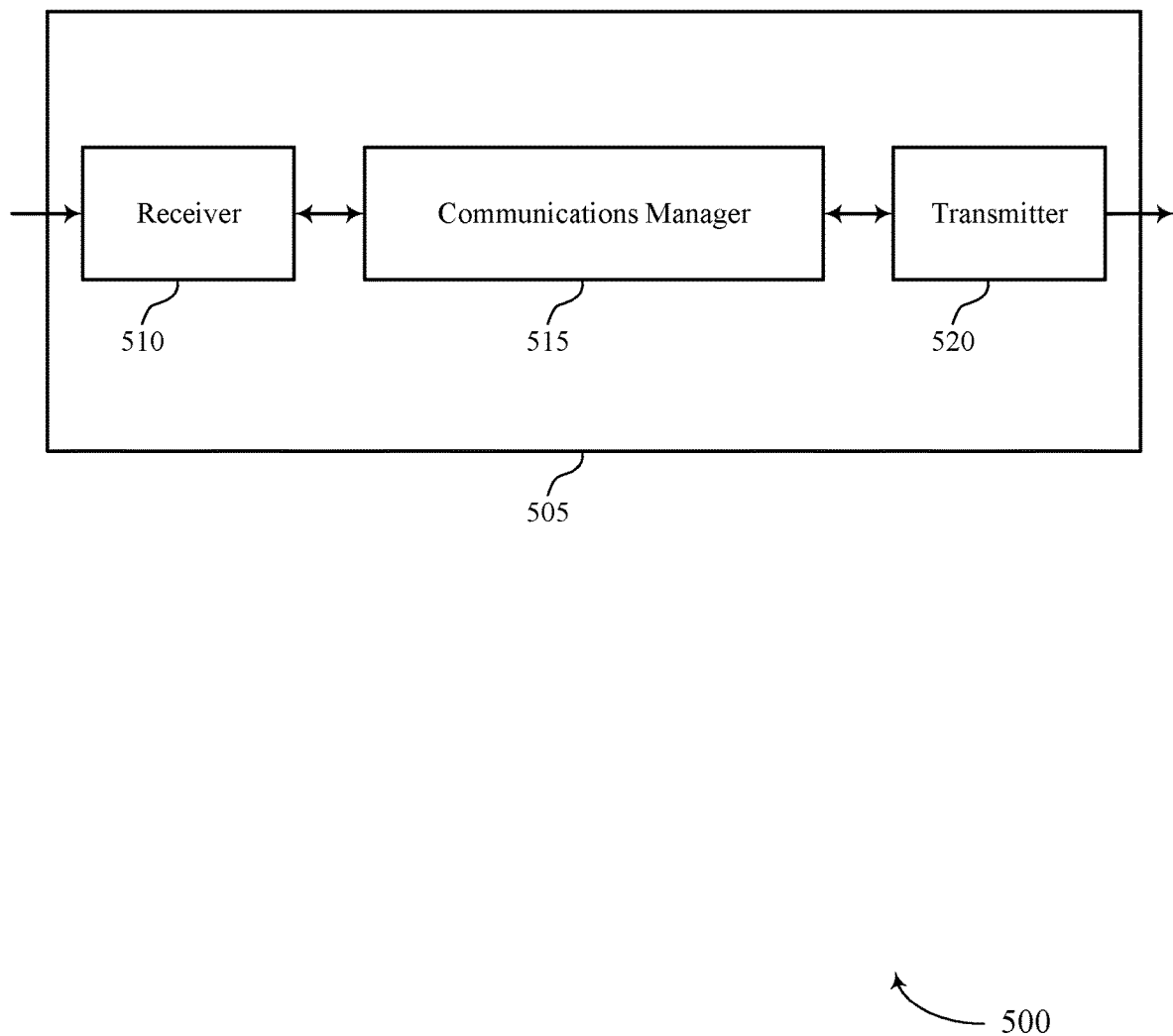
FIGS. 5 and 6 show block diagrams of devices that support resource configuration management in wireless communications in accordance with aspects of the present disclosure.

FIG. 5 shows a block diagram 500 of a device 505 that supports resource configuration management in wireless communications in accordance with aspects of the present disclosure. The device 505 may be an example of aspects of a UE 115 or base station 105 as described herein. The device 505 may include a receiver 510, a communications manager 515, and a transmitter 520. The device 505 may also include a processor. Each of these components may be in communication with one another (e.g., via one or more buses).

Receiver 510 may receive information such as packets, user data, or control information associated with various information channels (e.g., control channels, data channels, and information related to resource configuration management in wireless communications, etc.). Information may be passed on to other components of the device 505. The receiver 510 may be an example of aspects of the transceiver 820 or 920 as described with reference to FIGS. 8 and 9. The receiver 510 may utilize a single antenna or a set of antennas.

The communications manager 515 may operate in a first node of a multiple-hop wireless network and may identify a first preconfigured resource allocation of a set of preconfigured resource allocations of wireless resources that are available for communications between the first node and one or more of a parent node or a child node, select, after using the first preconfigured resource allocation, a second preconfigured resource allocation of the set of preconfigured resource allocations for communications with one or more of the parent node or the child node, and communicate with one or more of the parent node or the child node using the second preconfigured resource allocation.

The communications manager 515 may operate in a central entity of a multiple-hop wireless network, and may configure a first node of the multiple-hop wireless network with a set of preconfigured resource allocations, where each of the set of preconfigured resource allocations indicates different wireless resources that are available for communications between the first node and one or more of other nodes and provide the first node with the set of preconfigured resource allocations. The communications manager 515 may be an example of aspects of the communications manager 810 or 910 as described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 520 may transmit signals generated by other components of the device 505. In some examples, the transmitter 520 may be collocated with a receiver 510 in a transceiver module. For example, the transmitter 520 may be an example of aspects of the transceiver 820 or 920 as described with reference to FIGS. 8 and 9. The transmitter 520 may utilize a single antenna or a set of antennas.

Figure 6:
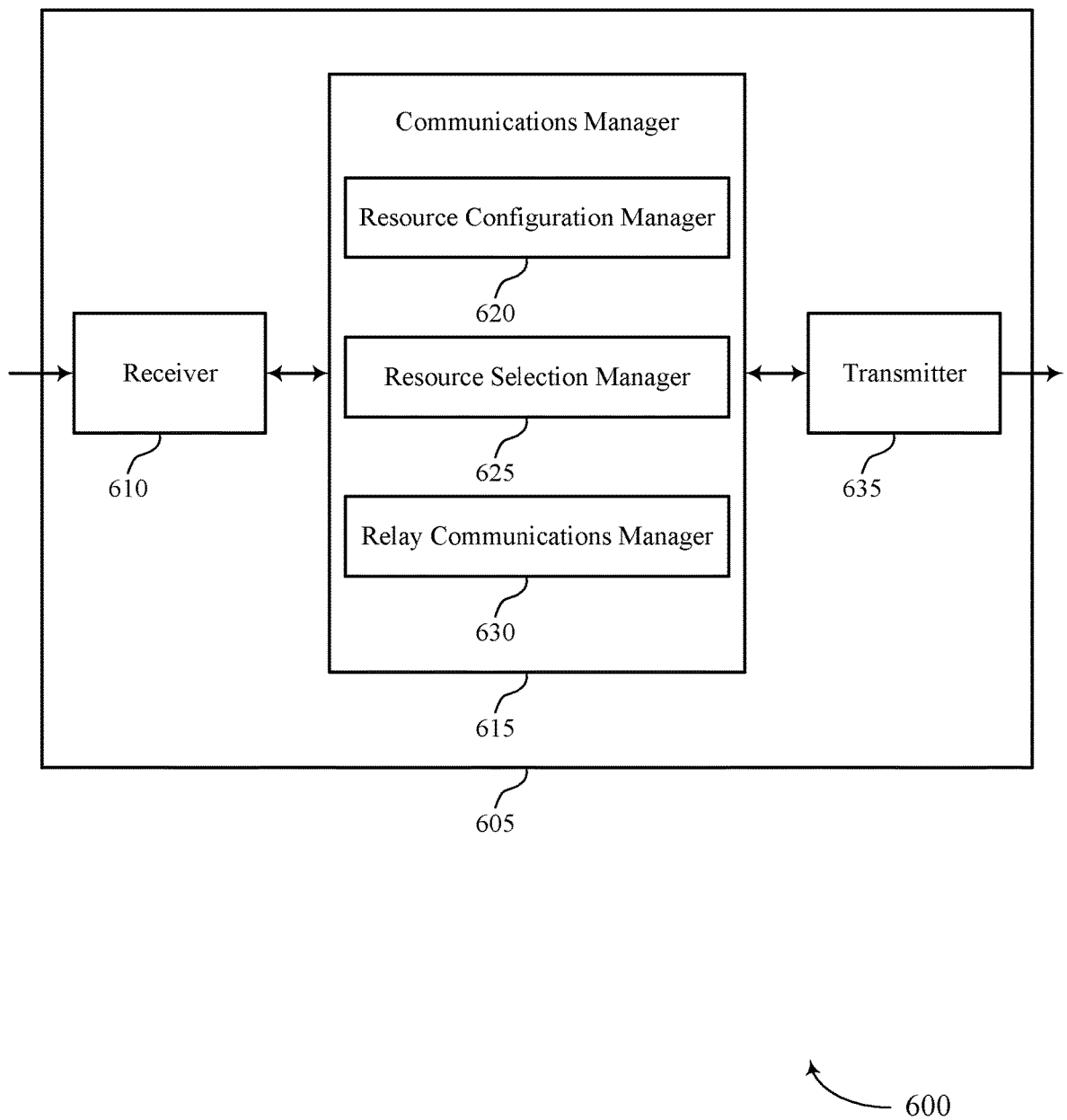

FIG. 6 shows a block diagram 600 of a device 605 that supports resource configuration management in wireless communications in accordance with aspects of the present disclosure. The device 605 may be an example of aspects of a device 505, a UE 115, or a base station 105 as described herein. The device 605 may include a receiver 610, a communications manager 615, and a transmitter 635. The device 605 may also include a processor. Each of these components may be in communication with one another (e.g., via one or more buses).

Receiver 610 may receive information such as packets, user data, or control information associated with various information channels (e.g., control channels, data channels, and information related to resource configuration management in wireless communications, etc.). Information may be passed on to other components of the device 605. The receiver 610 may be an example of aspects of the transceiver 820 or 920 as described with reference to FIGS. 8 and 9. The receiver 610 may utilize a single antenna or a set of antennas.

The communications manager 615 may be an example of aspects of the communications manager 515 as described herein. The communications manager 615 may include a resource configuration manager 620, a resource selection manager 625, and a relay communications manager 630. The communications manager 615 may be an example of aspects of the communications manager 810 or 910 as described herein.

In some cases, the resource configuration manager 620 may operate in a first node of a multiple-hop wireless network, and may identify a first preconfigured resource allocation of a set of preconfigured resource allocations of wireless resources that are available for communications between the first node and one or more of a parent node or a child node. The resource selection manager 625 may select, after using the first preconfigured resource allocation, a second preconfigured resource allocation of the set of preconfigured resource allocations for communications with one or more of the parent node or the child node. The relay communications manager 630 may communicate with one or more of the parent node or the child node using the second preconfigured resource allocation.

In some cases, the resource configuration manager 620 may operate in a central entity of a multiple-hop wireless network, and may configure a first node of the multiple-hop wireless network with a set of preconfigured resource allocations, where each of the set of preconfigured resource allocations indicates different wireless resources that are available for communications between the first node and one or more of other nodes. The relay communications manager 630 may provide the first node with the set of preconfigured resource allocations.

Transmitter 635 may transmit signals generated by other components of the device 605. In some examples, the transmitter 635 may be collocated with a receiver 610 in a transceiver module. For example, the transmitter 635 may be an example of aspects of the transceiver 820 or 920 as described with reference to FIGS. 8 and 9. The transmitter 635 may utilize a single antenna or a set of antennas.

Figure 7:
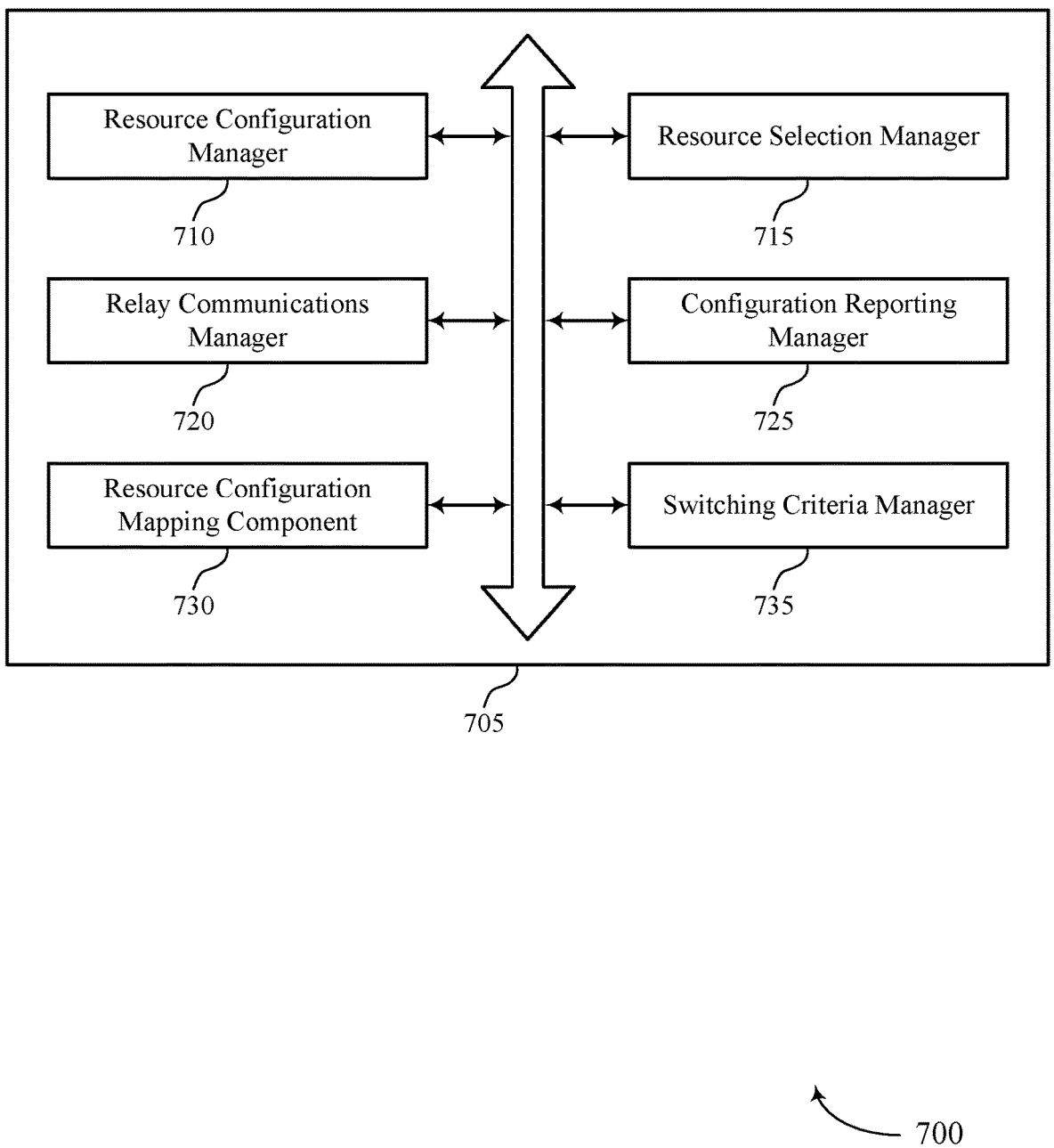
FIG. 7 shows a block diagram of a communications manager that supports resource configuration management in wireless communications in accordance with aspects of the present disclosure.

FIG. 7 shows a block diagram 700 of a communications manager 705 that supports resource configuration management in wireless communications in accordance with aspects of the present disclosure. The communications manager 705 may be an example of aspects of a communications manager 515, a communications manager 615, or a communications manager 810 described herein. The communications manager 705 may include a resource configuration manager 710, a resource selection manager 715, a relay communications manager 720, a configuration reporting manager 725, a resource configuration mapping component 730, and a switching criteria manager 735. Each of these modules may communicate, directly or indirectly, with one another (e.g., via one or more buses).

The resource configuration manager 710 may operate in a first node of a multiple-hop wireless network, and may identify a first preconfigured resource allocation of a set of preconfigured resource allocations of wireless resources that are available for communications between the first node and one or more of a parent node or a child node. In some examples, the resource configuration manager 710 may receive, from a central entity of the multiple-hop wireless network, configuration information that indicates each of the set of preconfigured resource allocations that are available to the first node for communications with one or more parent nodes or child nodes. In some examples, the resource configuration manager 710 may receive, from the central entity, an initial configuration that indicates the first preconfigured resource allocation is to be used for initial communications with one or more of the parent node or the child node. In some cases, the first preconfigured resource allocation is a default resource allocation that is provided in the configuration information. The resource selection manager 715 may select, after using the first preconfigured resource allocation, a second preconfigured resource allocation of the set of preconfigured resource allocations for communications with one or more of the parent node or the child node. In some examples, the resource selection manager 715 may receive, from one or more of the parent node or the child node, an indication of an updated resource allocation at the parent node or the child node, and where the selecting the second preconfigured resource allocation is based on the updated resource allocation.

In some examples, the resource configuration manager 710 may operate in a central entity of a multiple-hop wireless network, and may configure a first node of the multiple-hop wireless network with a set of preconfigured resource allocations, where each of the set of preconfigured resource allocations indicates different wireless resources that are available for communications between the first node and one or more of other nodes. In some examples, the resource selection manager 715 may provide an initial configuration to the first node that indicates a first preconfigured resource allocation of the set of preconfigured resource allocations is to be used for initial communications with one or more of the other nodes. In some examples, the resource selection manager 715 may determine that a second preconfigured resource allocation is to be used for the further communications with one or more of the other nodes. In some examples, the resource selection manager 715 may provide an indication to the first node to change to the second preconfigured resource allocation. In some examples, the resource selection manager 715 may receive an indication of acknowledgment from the first node. In some examples, the resource selection manager 715 may receive an indication from the first node that a second preconfigured resource allocation of the set of preconfigured resource allocations is to be used for further communications with one or more of the other nodes.

In some cases, the selecting the second preconfigured resource allocation is based on receiving, from a central entity of the multiple-hop wireless network, an indication to change to the second preconfigured resource allocation. In some cases, the indication is received in a downlink control information transmission, an uplink control information transmission, in a medium access control (MAC) control element (CE), or any combinations thereof. In some cases, the indication of the updated resource allocation further indicates that the first node is to select the second preconfigured resource allocation.

In some cases, the first node is a first parent node and the indication of the updated resource allocation is received from a first child node, and where the indication of the updated resource allocation is a request from the first child node to use the updated resource allocation. In some cases, the first node transmits a response to the first child node that the request is granted and that indicates the second preconfigured resource allocation of the first node. In some cases, the first preconfigured resource allocation is a default resource allocation that is provided in configuration information that is provided to the first node.

The relay communications manager 720 may communicate with one or more of the parent node or the child node using the second preconfigured resource allocation. In some examples, the relay communications manager 720 may provide the first node with the set of preconfigured resource allocations.

The configuration reporting manager 725 may transmit an indication that the second preconfigured resource allocation has been selected for communications of the first node to one or more of the parent node, the child node, or a central entity of the multiple-hop wireless network.

The resource configuration mapping component 730 may provide mapping for certain configurations. In some cases, the first node is a first child node and the indication of the updated resource allocation is received from a first parent node, and where the second preconfigured resource allocation is selected based on a mapping of a subset of the set of preconfigured resource allocations that are compatible with the updated resource allocation of the first parent node. In some cases, the mapping of the subset of the set of preconfigured resource allocations that are compatible with the updated resource allocation of the first parent node is explicitly indicated in configuration information that configures the set of preconfigured resource allocations or determined based on one or more mapping rules.

The switching criteria manager 735 may determine that one or more preconfigured criteria for switching preconfigured resource allocations have been met, and where the selecting the second preconfigured resource allocation is based on the one or more preconfigured criteria. In some cases, the one or more preconfigured criteria are received in configuration information from a central entity of the multiple-hop wireless network.

In some cases, the one or more preconfigured criteria are based on a beam that is used for communications between the first node and one or more of the parent node or the child node, and where the first preconfigured resource allocation is associated with a first beam and the second preconfigured resource allocation is associated with a second beam. In some cases, the first preconfigured resource allocation and the second preconfigured resource allocation are associated with different multiplexing parameters of the associated first beam and second beam. In some cases, the one or more preconfigured criteria are based on a power saving mode that is used for communications between the first node and one or more of the parent node or the child node, and where the first preconfigured resource allocation is associated with a first power saving mode and the second preconfigured resource allocation is associated with a second power saving mode. In some cases, the one or more preconfigured criteria are based on a topological state of one or more of the first node, the parent node, or the child node, and where the first preconfigured resource allocation is associated with a first topological state and the second preconfigured resource allocation is associated with a second topological state. In some cases, the one or more preconfigured criteria are based on a quality of service associated with communications between the first node and one or more of the parent node or the child node, and where the first preconfigured resource allocation is associated with a first quality of service and the second preconfigured resource allocation is associated with a second quality of service.

Figure 8:
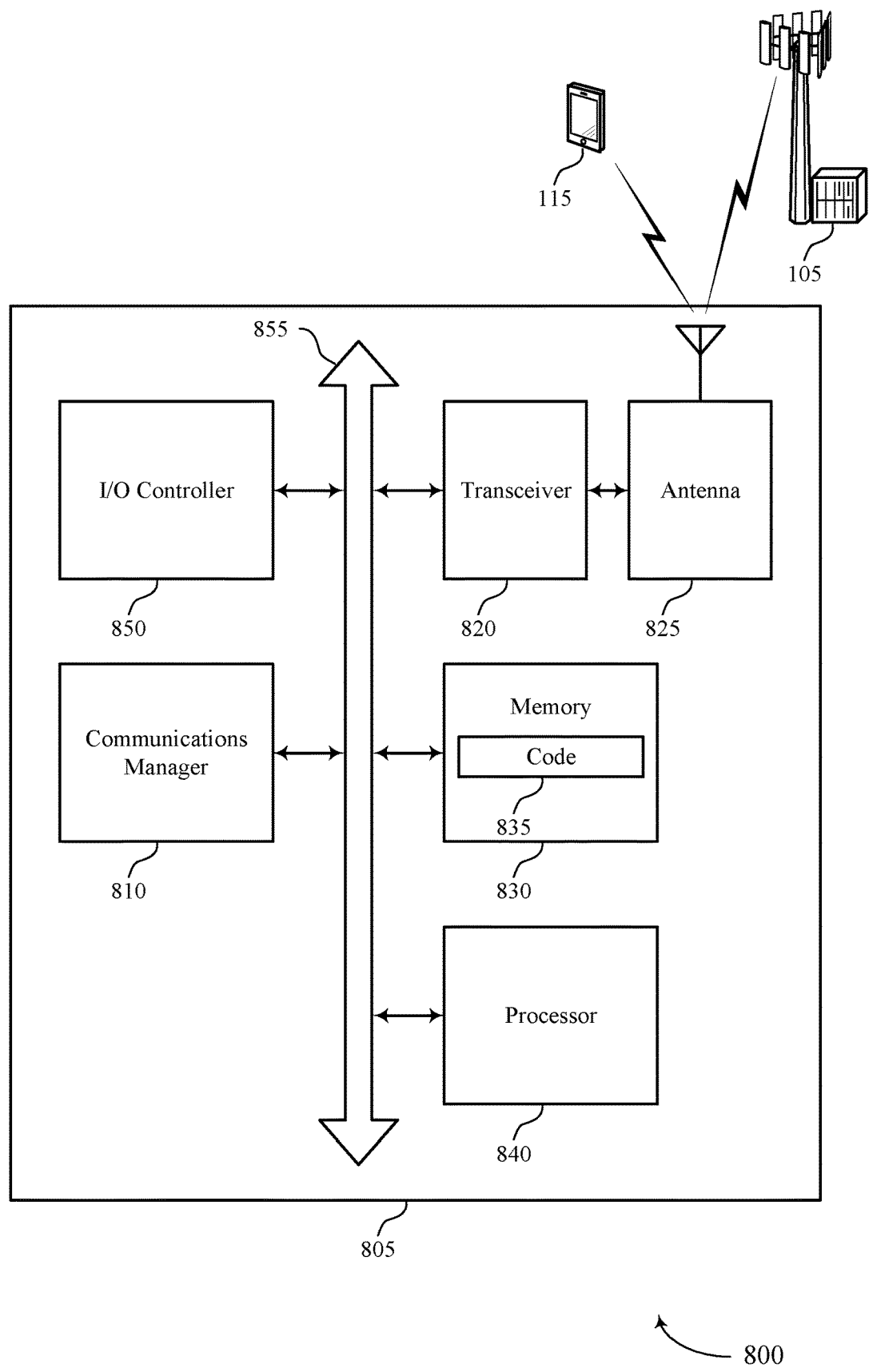
FIG. 8 shows a diagram of a system including a user equipment (UE) that supports resource configuration management in wireless communications in accordance with aspects of the present disclosure.

FIG. 8 shows a diagram of a system 800 including a device 805 that supports resource configuration management in wireless communications in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, a transceiver 820, an antenna 825, memory 830, a processor 840, and an I/O controller 850. These components may be in electronic communication via one or more buses (e.g., bus 855).

In some cases, the communications manager 810 may operate in a first node of a multiple-hop wireless network, and may identify a first preconfigured resource allocation of a set of preconfigured resource allocations of wireless resources that are available for communications between the first node and one or more of a parent node or a child node, select, after using the first preconfigured resource allocation, a second preconfigured resource allocation of the set of preconfigured resource allocations for communications with one or more of the parent node or the child node, and communicate with one or more of the parent node or the child node using the second preconfigured resource allocation.

In some cases, the communications manager 810 may operate in a central entity of a multiple-hop wireless network, and may configure a first node of the multiple-hop wireless network with a set of preconfigured resource allocations, where each of the set of preconfigured resource allocations indicates different wireless resources that are available for communications between the first node and one or more of other nodes and provide the first node with the set of preconfigured resource allocations.

Transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM, ROM, or a combination thereof. The memory 830 may store computer-readable code 835 including instructions that, when executed by a processor (e.g., the processor 840) cause the device to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting resource configuration management in wireless communications).

The I/O controller 850 may manage input and output signals for the device 805. The I/O controller 850 may also manage peripherals not integrated into the device 805. In some cases, the I/O controller 850 may represent a physical connection or port to an external peripheral. In some cases, the I/O controller 850 may utilize an operating system such as iOS®, ANDROID®, MS-DOS®, MS-WINDOWS®, OS/2®, UNIX®, LINUX®, or another known operating system. In other cases, the I/O controller 850 may represent or interact with a modem, a keyboard, a mouse, a touchscreen, or a similar device. In some cases, the I/O controller 850 may be implemented as part of a processor. In some cases, a user may interact with the device 805 via the I/O controller 850 or via hardware components controlled by the I/O controller 850.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
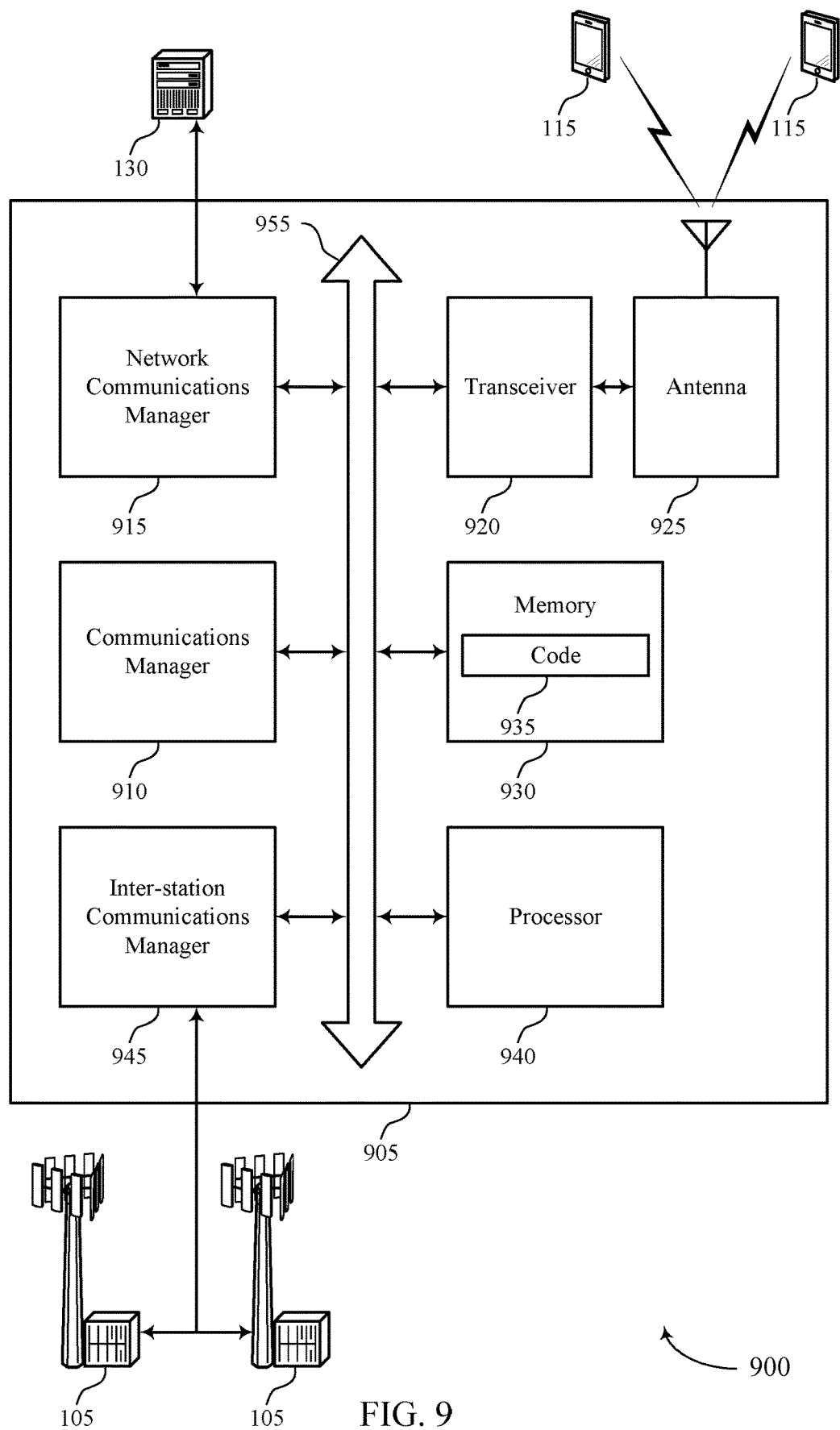
FIG. 9 shows a diagram of a system including a base station that supports resource configuration management in wireless communications in accordance with aspects of the present disclosure.

FIG. 9 shows a diagram of a system 900 including a device 905 that supports resource configuration management in wireless communications in accordance with aspects of the present disclosure. The device 905 may be an example of or include the components of device 505, device 605, or a base station 105 as described herein. The device 905 may include components for bi-directional voice and data communications including components for transmitting and receiving communications, including a communications manager 910, a network communications manager 915, a transceiver 920, an antenna 925, memory 930, a processor 940, and an inter-station communications manager 945. These components may be in electronic communication via one or more buses (e.g., bus 955).

In some cases, the communications manager 910 may operate in a first node of a multiple-hop wireless network, and may identify a first preconfigured resource allocation of a set of preconfigured resource allocations of wireless resources that are available for communications between the first node and one or more of a parent node or a child node, select, after using the first preconfigured resource allocation, a second preconfigured resource allocation of the set of preconfigured resource allocations for communications with one or more of the parent node or the child node, and communicate with one or more of the parent node or the child node using the second preconfigured resource allocation.

In some cases, the communications manager 910 may operate in a central entity of a multiple-hop wireless network, and may configure a first node of the multiple-hop wireless network with a set of preconfigured resource allocations, where each of the set of preconfigured resource allocations indicates different wireless resources that are available for communications between the first node and one or more of other nodes and provide the first node with the set of preconfigured resource allocations.

Network communications manager 915 may manage communications with the core network (e.g., via one or more wired backhaul links). For example, the network communications manager 915 may manage the transfer of data communications for client devices, such as one or more UEs 115.

Transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor (e.g., the processor 940) cause the device to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting resource configuration management in wireless communications).

Inter-station communications manager 945 may manage communications with other base station 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, inter-station communications manager 945 may provide an X2 interface within an LTE/LTE-A wireless communication network technology to provide communication between base stations 105.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
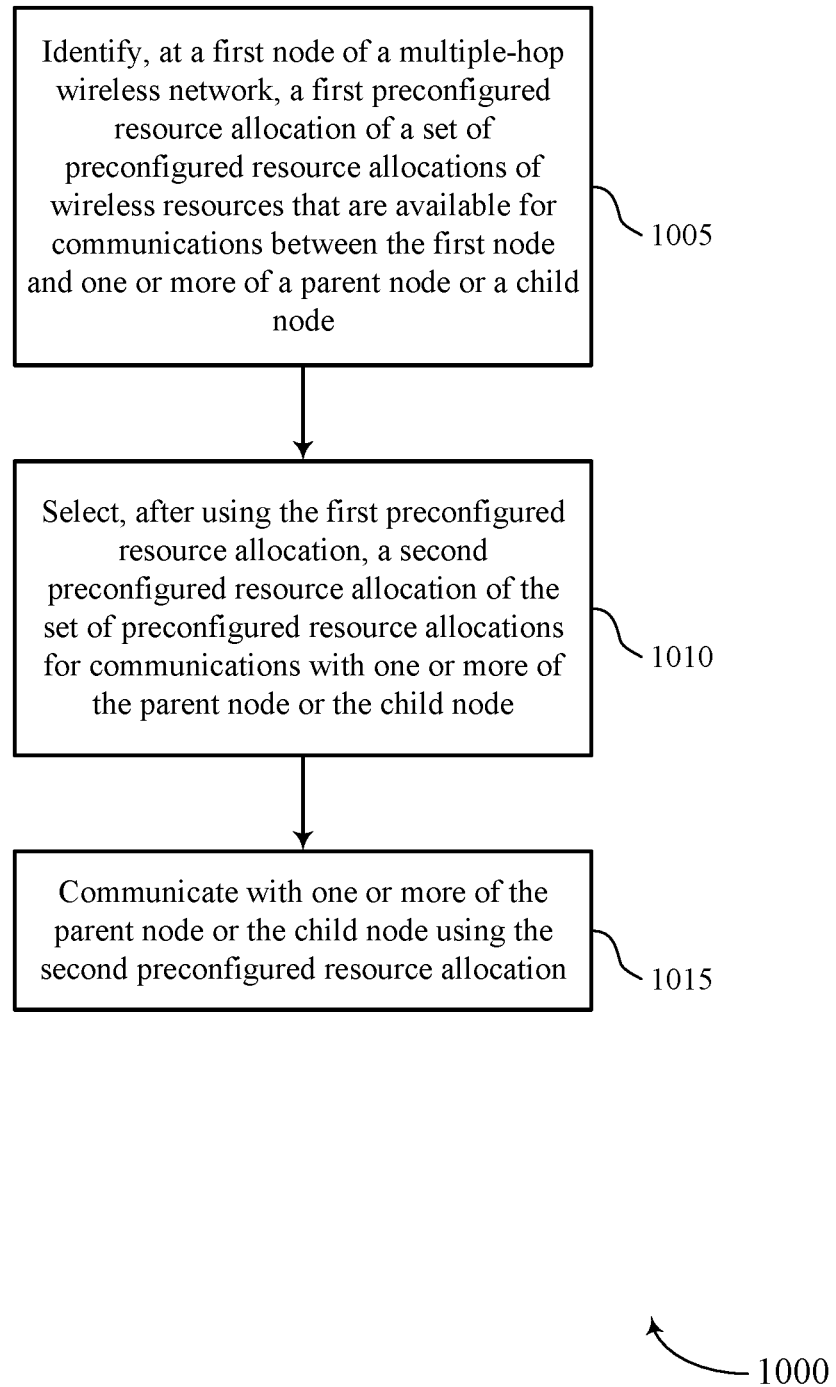
FIGS. 10 through 14 show flowcharts illustrating methods that support resource configuration management in wireless communications in accordance with aspects of the present disclosure.

FIG. 10 shows a flowchart illustrating a method 1000 that supports resource configuration management in wireless communications in accordance with aspects of the present disclosure. The operations of method 1000 may be implemented by a multi-hop network node (e.g., a central entity or relay node) or its components as described herein. For example, the operations of method 1000 may be performed by a communications manager as described with reference to FIGS. 5 through 9. In some examples, a multi-hop network node may execute a set of instructions to control the functional elements of the multi-hop network node to perform the functions described below. Additionally or alternatively, a multi-hop network node may perform aspects of the functions described below using special-purpose hardware.

At 1005, the multi-hop network node may identify, at a first node of a multiple-hop wireless network, a first preconfigured resource allocation of a set of preconfigured resource allocations of wireless resources that are available for communications between the first node and one or more of a parent node or a child node. The operations of 1005 may be performed according to the methods described herein. In some examples, aspects of the operations of 1005 may be performed by a resource configuration manager as described with reference to FIGS. 5 through 9.

At 1010, the multi-hop network node may select, after using the first preconfigured resource allocation, a second preconfigured resource allocation of the set of preconfigured resource allocations for communications with one or more of the parent node or the child node. The operations of 1010 may be performed according to the methods described herein. In some examples, aspects of the operations of 1010 may be performed by a resource selection manager as described with reference to FIGS. 5 through 9.

At 1015, the multi-hop network node may communicate with one or more of the parent node or the child node using the second preconfigured resource allocation. The operations of 1015 may be performed according to the methods described herein. In some examples, aspects of the operations of 1015 may be performed by a relay communications manager as described with reference to FIGS. 5 through 9.

Figure 11:
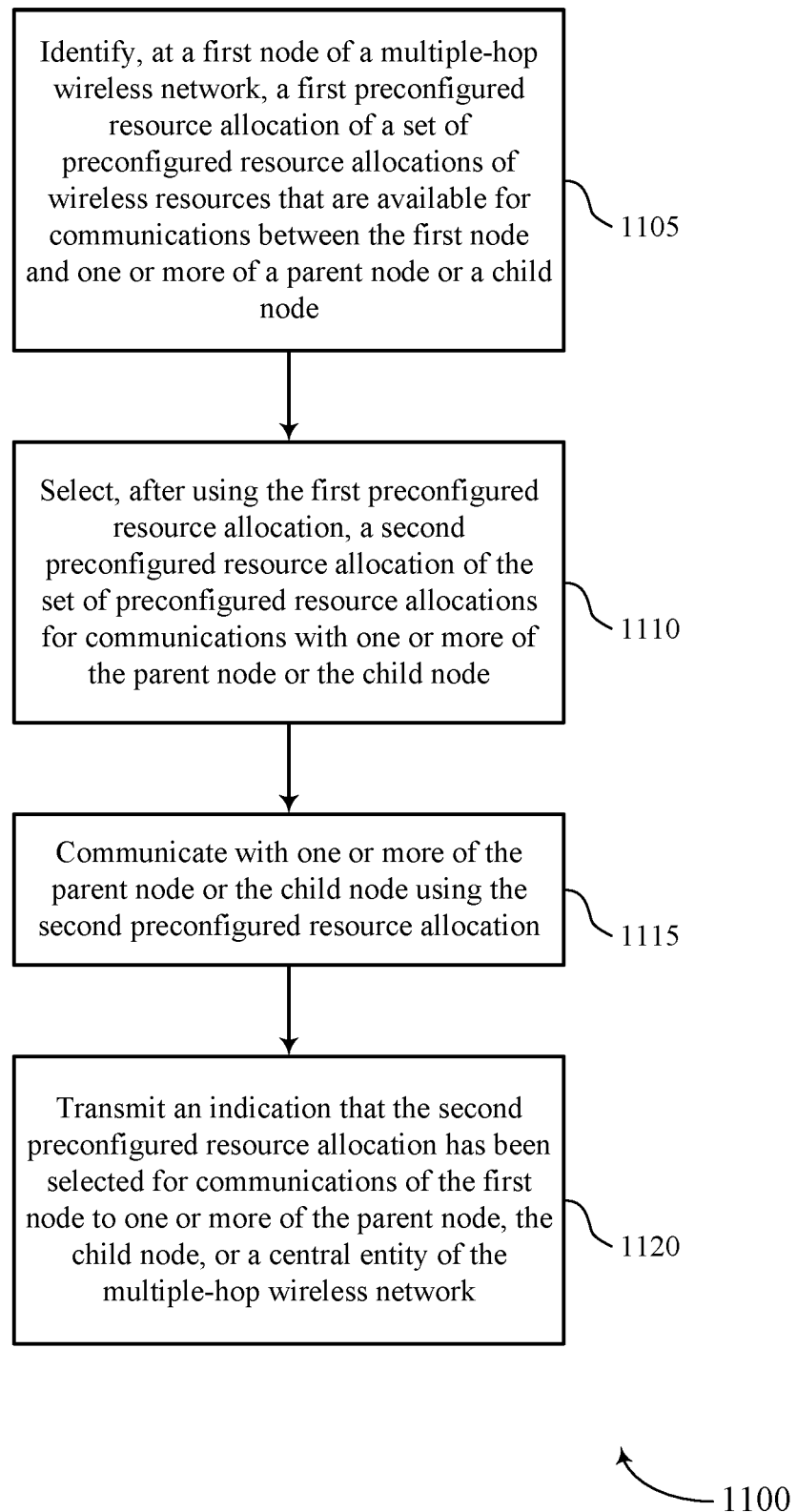

FIG. 11 shows a flowchart illustrating a method 1100 that supports resource configuration management in wireless communications in accordance with aspects of the present disclosure. The operations of method 1100 may be implemented by a multi-hop network node (e.g., a central entity or relay node) or its components as described herein. For example, the operations of method 1100 may be performed by a communications manager as described with reference to FIGS. 5 through 9. In some examples, a multi-hop network node may execute a set of instructions to control the functional elements of the multi-hop network node to perform the functions described below. Additionally or alternatively, a multi-hop network node may perform aspects of the functions described below using special-purpose hardware.

At 1105, the multi-hop network node may identify, at a first node of a multiple-hop wireless network, a first preconfigured resource allocation of a set of preconfigured resource allocations of wireless resources that are available for communications between the first node and one or more of a parent node or a child node. The operations of 1105 may be performed according to the methods described herein. In some examples, aspects of the operations of 1105 may be performed by a resource configuration manager as described with reference to FIGS. 5 through 9.

At 1110, the multi-hop network node may select, after using the first preconfigured resource allocation, a second preconfigured resource allocation of the set of preconfigured resource allocations for communications with one or more of the parent node or the child node. The operations of 1110 may be performed according to the methods described herein. In some examples, aspects of the operations of 1110 may be performed by a resource selection manager as described with reference to FIGS. 5 through 9.

At 1115, the multi-hop network node may communicate with one or more of the parent node or the child node using the second preconfigured resource allocation. The operations of 1115 may be performed according to the methods described herein. In some examples, aspects of the operations of 1115 may be performed by a relay communications manager as described with reference to FIGS. 5 through 9.

At 1120, the multi-hop network node may transmit an indication that the second preconfigured resource allocation has been selected for communications of the first node to one or more of the parent node, the child node, or a central entity of the multiple-hop wireless network. The operations of 1120 may be performed according to the methods described herein. In some examples, aspects of the operations of 1120 may be performed by a configuration reporting manager as described with reference to FIGS. 5 through 9.

Figure 12:
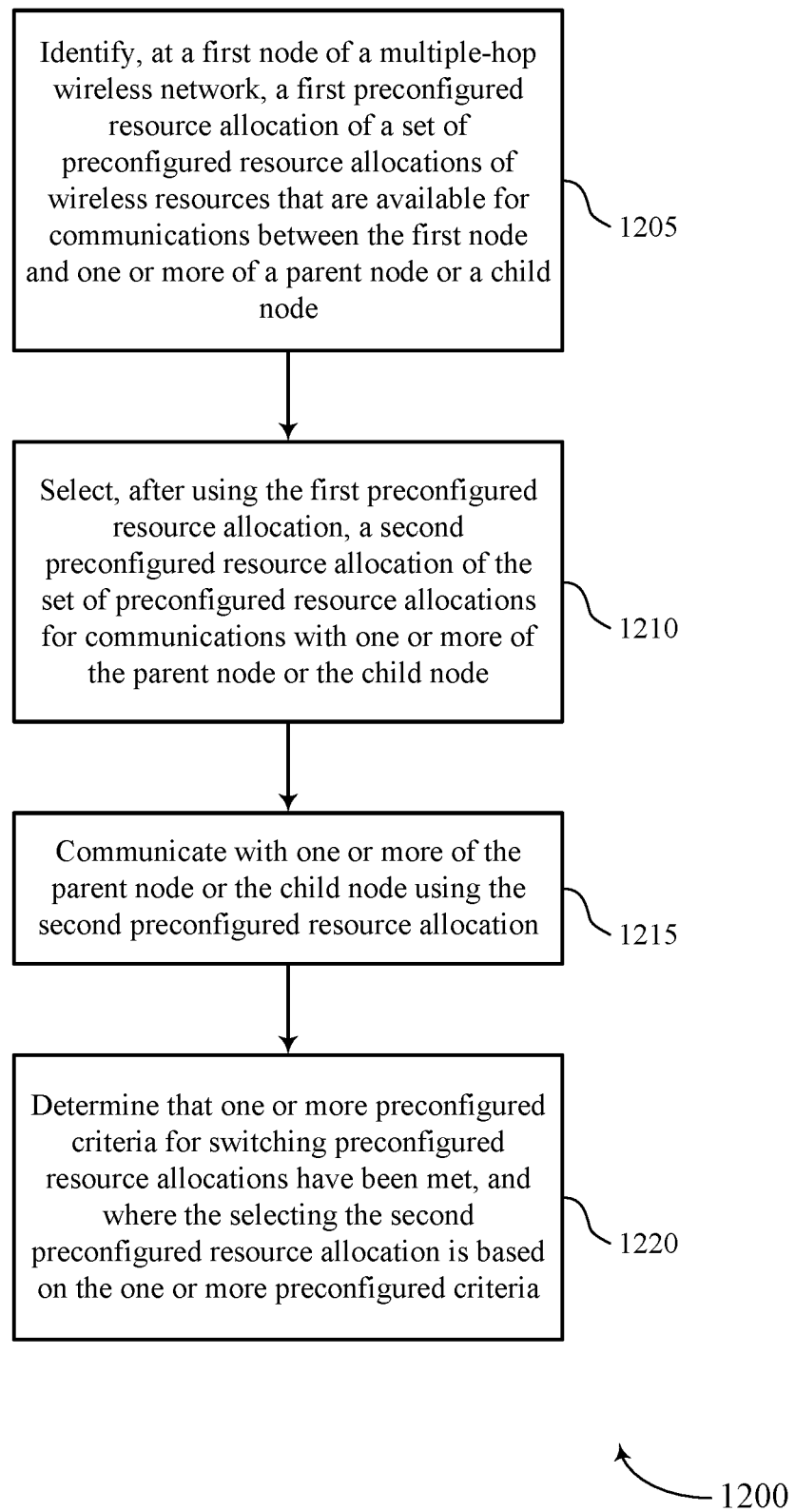

FIG. 12 shows a flowchart illustrating a method 1200 that supports resource configuration management in wireless communications in accordance with aspects of the present disclosure. The operations of method 1200 may be implemented by a multi-hop network node (e.g., a central entity or relay node) or its components as described herein. For example, the operations of method 1200 may be performed by a communications manager as described with reference to FIGS. 5 through 9. In some examples, a multi-hop network node may execute a set of instructions to control the functional elements of the multi-hop network node to perform the functions described below. Additionally or alternatively, a multi-hop network node may perform aspects of the functions described below using special-purpose hardware.

At 1205, the multi-hop network node may identify, at a first node of a multiple-hop wireless network, a first preconfigured resource allocation of a set of preconfigured resource allocations of wireless resources that are available for communications between the first node and one or more of a parent node or a child node. The operations of 1205 may be performed according to the methods described herein. In some examples, aspects of the operations of 1205 may be performed by a resource configuration manager as described with reference to FIGS. 5 through 9.

At 1210, the multi-hop network node may select, after using the first preconfigured resource allocation, a second preconfigured resource allocation of the set of preconfigured resource allocations for communications with one or more of the parent node or the child node. The operations of 1210 may be performed according to the methods described herein. In some examples, aspects of the operations of 1210 may be performed by a resource selection manager as described with reference to FIGS. 5 through 9.

At 1215, the multi-hop network node may communicate with one or more of the parent node or the child node using the second preconfigured resource allocation. The operations of 1215 may be performed according to the methods described herein. In some examples, aspects of the operations of 1215 may be performed by a relay communications manager as described with reference to FIGS. 5 through 9.

At 1220, the multi-hop network node may determine that one or more preconfigured criteria for switching preconfigured resource allocations have been met, and where the selecting the second preconfigured resource allocation is based on the one or more preconfigured criteria. The operations of 1220 may be performed according to the methods described herein. In some examples, aspects of the operations of 1220 may be performed by a switching criteria manager as described with reference to FIGS. 5 through 9.

Figure 13:
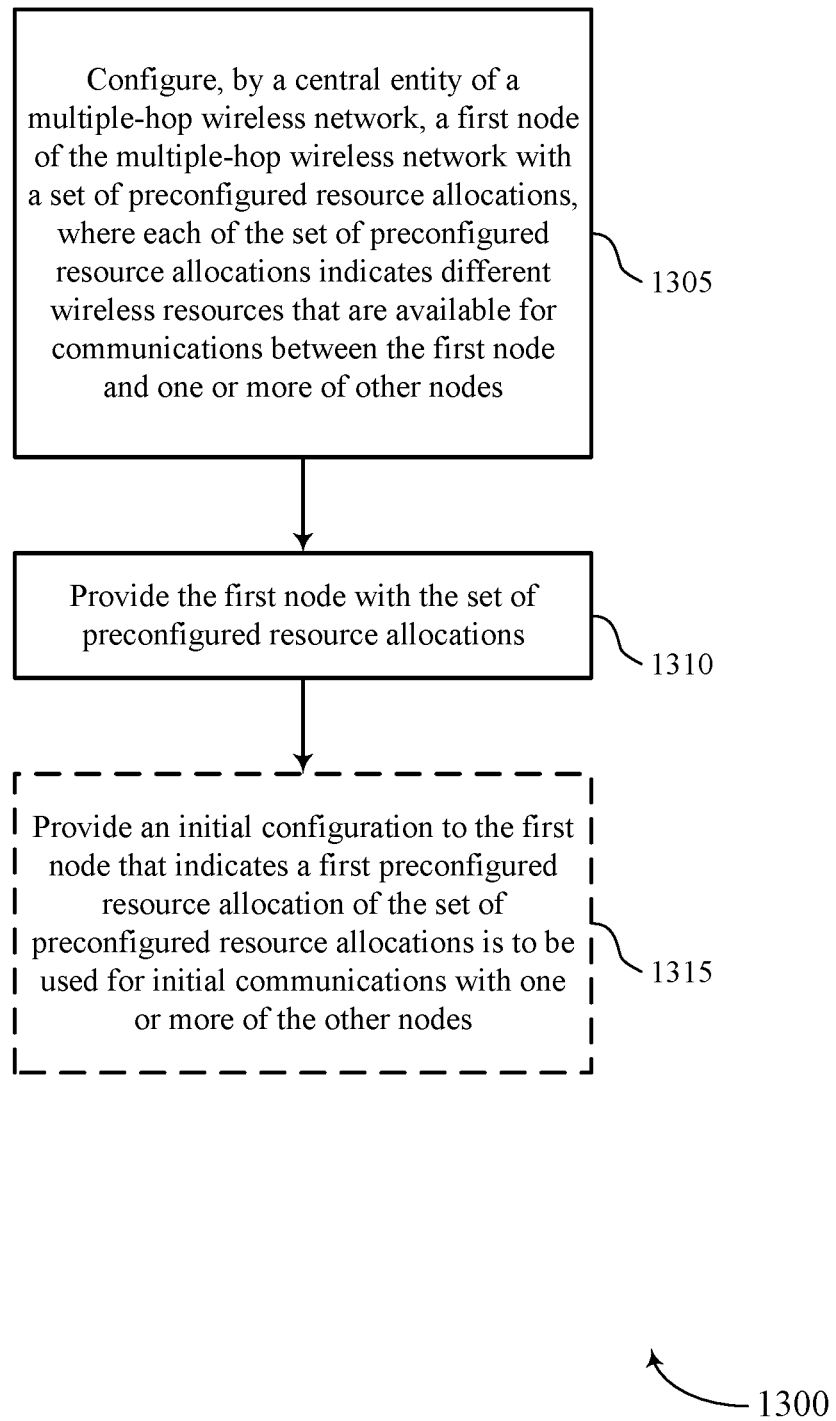

FIG. 13 shows a flowchart illustrating a method 1300 that supports resource configuration management in wireless communications in accordance with aspects of the present disclosure. The operations of method 1300 may be implemented by a multi-hop network node (e.g., a central entity or relay node) or its components as described herein. For example, the operations of method 1300 may be performed by a communications manager as described with reference to FIGS. 5 through 9. In some examples, a multi-hop network node may execute a set of instructions to control the functional elements of the multi-hop network node to perform the functions described below. Additionally or alternatively, a multi-hop network node may perform aspects of the functions described below using special-purpose hardware.

At 1305, the multi-hop network node may configure, by a central entity of a multiple-hop wireless network, a first node of the multiple-hop wireless network with a set of preconfigured resource allocations, where each of the set of preconfigured resource allocations indicates different wireless resources that are available for communications between the first node and one or more of other nodes. The operations of 1305 may be performed according to the methods described herein. In some examples, aspects of the operations of 1305 may be performed by a resource configuration manager as described with reference to FIGS. 5 through 9.

At 1310, the multi-hop network node may provide the first node with the set of preconfigured resource allocations. The operations of 1310 may be performed according to the methods described herein. In some examples, aspects of the operations of 1310 may be performed by a relay communications manager as described with reference to FIGS. 5 through 9.

Optionally, at 1315, the multi-hop network node may provide an initial configuration to the first node that indicates a first preconfigured resource allocation of the set of preconfigured resource allocations is to be used for initial communications with one or more of the other nodes. The operations of 1315 may be performed according to the methods described herein. In some examples, aspects of the operations of 1315 may be performed by a resource selection manager as described with reference to FIGS. 5 through 9.

Figure 14:
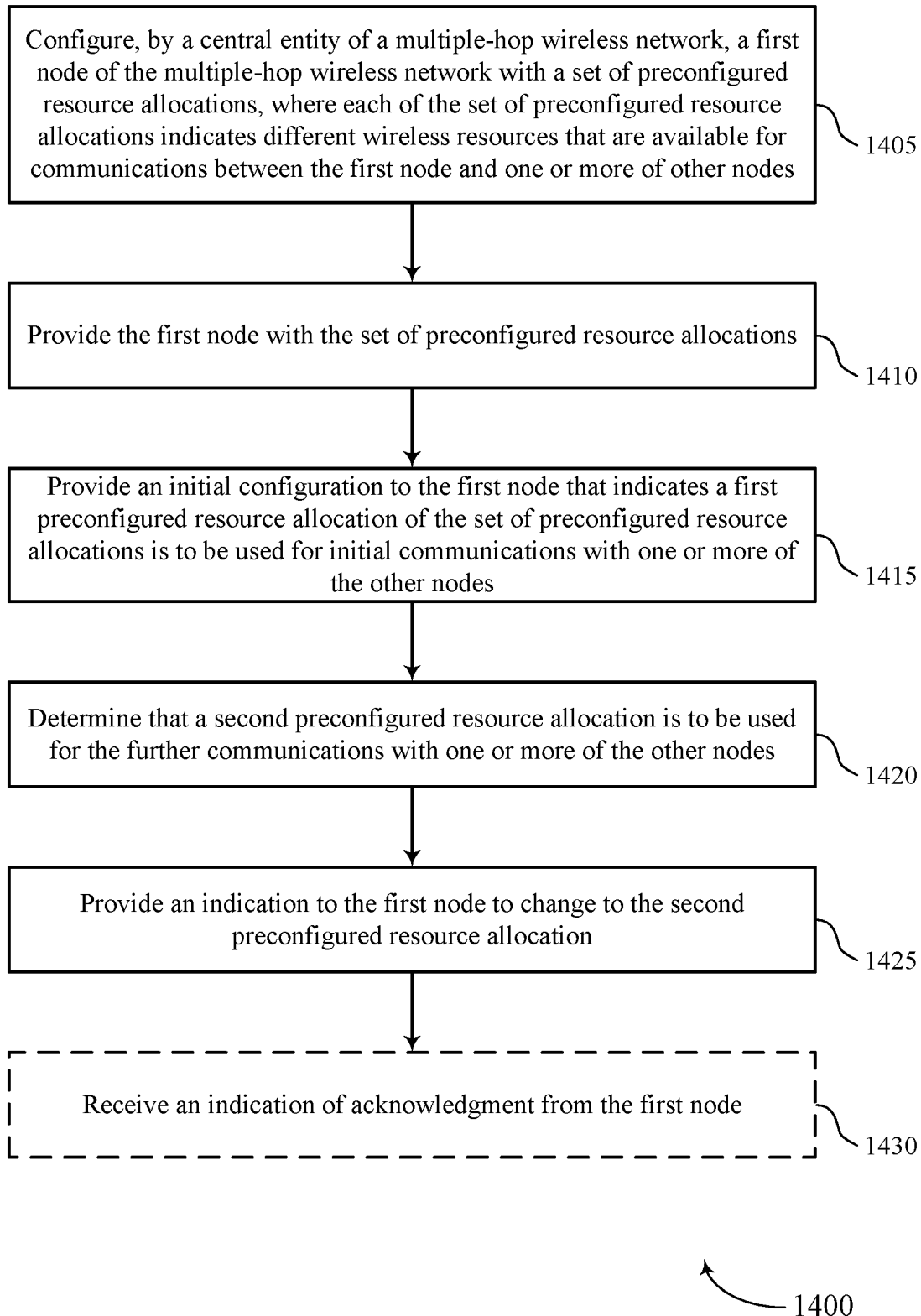

FIG. 14 shows a flowchart illustrating a method 1400 that supports resource configuration management in wireless communications in accordance with aspects of the present disclosure. The operations of method 1400 may be implemented by a multi-hop network node (e.g., a central entity or relay node) or its components as described herein. For example, the operations of method 1400 may be performed by a communications manager as described with reference to FIGS. 5 through 9. In some examples, a multi-hop network node may execute a set of instructions to control the functional elements of the multi-hop network node to perform the functions described below. Additionally or alternatively, a multi-hop network node may perform aspects of the functions described below using special-purpose hardware.

At 1405, the multi-hop network node may configure, by a central entity of a multiple-hop wireless network, a first node of the multiple-hop wireless network with a set of preconfigured resource allocations, where each of the set of preconfigured resource allocations indicates different wireless resources that are available for communications between the first node and one or more of other nodes. The operations of 1405 may be performed according to the methods described herein. In some examples, aspects of the operations of 1405 may be performed by a resource configuration manager as described with reference to FIGS. 5 through 9.

At 1410, the multi-hop network node may provide the first node with the set of preconfigured resource allocations. The operations of 1410 may be performed according to the methods described herein. In some examples, aspects of the operations of 1410 may be performed by a relay communications manager as described with reference to FIGS. 5 through 9.

At 1415, the multi-hop network node may provide an initial configuration to the first node that indicates a first preconfigured resource allocation of the set of preconfigured resource allocations is to be used for initial communications with one or more of the other nodes. The operations of 1415 may be performed according to the methods described herein. In some examples, aspects of the operations of 1415 may be performed by a resource selection manager as described with reference to FIGS. 5 through 9.

At 1420, the multi-hop network node may determine that a second preconfigured resource allocation is to be used for the further communications with one or more of the other nodes. The operations of 1420 may be performed according to the methods described herein. In some examples, aspects of the operations of 1420 may be performed by a resource selection manager as described with reference to FIGS. 5 through 9.

At 1425, the multi-hop network node may provide an indication to the first node to change to the second preconfigured resource allocation. The operations of 1425 may be performed according to the methods described herein. In some examples, aspects of the operations of 1425 may be performed by a resource selection manager as described with reference to FIGS. 5 through 9.

Optionally, at 1430, the multi-hop network node may receive an indication of acknowledgment from the first node. The operations of 1430 may be performed according to the methods described herein. In some examples, aspects of the operations of 1430 may be performed by a resource selection manager as described with reference to FIGS. 5 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying, at a first node of a multiple-hop wireless network, a first preconfigured resource allocation of a plurality of preconfigured resource allocations of wireless resources that are available for communications between the first node and one or more of a parent node or a child node, wherein the first node is a relay node in the multiple-hop wireless network;
selecting, at the first node after using the first preconfigured resource allocation, a second preconfigured resource allocation of the plurality of preconfigured resource allocations for communications with one or more of the parent node or the child node, wherein the second preconfigured resource allocation is selected by the first node for one or more communications with one or more of the parent node or the child node based at least in part on one or more preconfigured criteria for switching preconfigured resource allocations, the one or more preconfigured criteria including one or more of a beam that is used for communications between the first node and one or more of the parent node or the child node, a power saving mode that is used for communications between the first node and one or more of the parent node or the child node, or a quality of service associated with communications between the first node and one or more of the parent node or the child node; and communicating with one or more of the parent node or the child node using the second preconfigured resource allocation.

2. The method of claim 1, further comprising:

receiving, from a central entity of the multiple-hop wireless network, configuration information that indicates each of the plurality of preconfigured resource allocations that are available to the first node for communications with one or more parent nodes or child nodes; and receiving, from the central entity, an initial configuration that indicates the first preconfigured resource allocation is to be used for initial communications with one or more of the parent node or the child node.

3. The method of claim 2, wherein the first preconfigured resource allocation is a default resource allocation that is provided in the configuration information.

4. The method of claim 1, wherein the selecting the second preconfigured resource allocation is based at least in part on receiving, from a central entity of the multiple-hop wireless network, an indication to change to the second preconfigured resource allocation.

5. The method of claim 1, further comprising:

transmitting an indication that the second preconfigured resource allocation has been selected for communications of the first node to one or more of the parent node, the child node, or a central entity of the multiple-hop wireless network.

6. The method of claim 1, further comprising:

receiving, from one or more of the parent node or the child node, an indication of an updated resource allocation at the parent node or the child node, and wherein the selecting the second preconfigured resource allocation is based at least in part on the updated resource allocation.

7. The method of claim 6, wherein the indication is received in a downlink control information transmission, an uplink control information transmission, in a medium access control (MAC) control element (CE), or any combinations thereof.

8. The method of claim 6, wherein the first node is a first child node and the indication of the updated resource allocation is received from a first parent node, and wherein the second preconfigured resource allocation is selected based at least in part on a mapping of a subset of the plurality of preconfigured resource allocations that are compatible with the updated resource allocation of the first parent node.

9. The method of claim 8, wherein the mapping of the subset of the plurality of preconfigured resource allocations that are compatible with the updated resource allocation of the first parent node is explicitly indicated in configuration information that configures the plurality of preconfigured resource allocations or determined based on one or more mapping rules.

10. The method of claim 6, wherein the indication of the updated resource allocation further indicates that the first node is to select the second preconfigured resource allocation.

11. The method of claim 6, wherein the first node is a first parent node and the indication of the updated resource allocation is received from a first child node, and wherein the indication of the updated resource allocation is a request from the first child node to use the updated resource allocation, and wherein the first node transmits a response to the first child node that the request is granted and that indicates the second preconfigured resource allocation of the first node.

12. The method of claim 1, further comprising:

determining that at least one of the one or more preconfigured criteria for switching preconfigured resource allocations have been met, and wherein the selecting the second preconfigured resource allocation is based at least in part on the one or more preconfigured criteria.

13. The method of claim 12, wherein the one or more preconfigured criteria are received in configuration information from a central entity of the multiple-hop wireless network.

14. The method of claim 12, wherein the one or more preconfigured criteria are based at least in part on the beam that is used for communications between the first node and one or more of the parent node or the child node, wherein the first preconfigured resource allocation is associated with a first beam and the second preconfigured resource allocation is associated with a second beam, and wherein the first preconfigured resource allocation and the second preconfigured resource allocation are associated with different multiplexing parameters of the associated first beam and second beam.

15. The method of claim 12, wherein the one or more preconfigured criteria are based at least in part on the power saving mode that is used for communications between the first node and one or more of the parent node or the child node, and wherein the first preconfigured resource allocation is associated with a first power saving mode and the second preconfigured resource allocation is associated with a second power saving mode.

16. The method of claim 12, wherein the one or more preconfigured criteria are based at least in part on a topological state of one or more of the first node, the parent node, or the child node, and wherein the first preconfigured resource allocation is associated with a first topological state and the second preconfigured resource allocation is associated with a second topological state.

17. The method of claim 12, wherein the one or more preconfigured criteria are based at least in part on the quality of service associated with communications between the first node and one or more of the parent node or the child node, and wherein the first preconfigured resource allocation is associated with a first quality of service and the second preconfigured resource allocation is associated with a second quality of service.

18. A method for wireless communication, comprising:

configuring, by a central entity of a multiple-hop wireless network, a first node of the multiple-hop wireless network with a plurality of preconfigured resource allocations, wherein the first node is a relay node in the multiple-hop wireless network and each of the plurality of preconfigured resource allocations indicates different wireless resources that are available for communications between the first node and one or more of other nodes, and wherein a preconfigured resource allocation of the plurality of preconfigured resource allocations is selected by the first node for one or more communications with the one or more other nodes based at least in part on one or more preconfigured criteria for switching preconfigured resource allocations, the one or more preconfigured criteria including one or more of a beam that is used for communications between the first node and the one or more other nodes, a power saving mode that is used for communications between the first node and the one or more other nodes, or a quality of service associated with communications between the first node and the one or more other nodes; and providing the first node with the plurality of preconfigured resource allocations.

19. The method of claim 18, further comprising:
providing an initial configuration to the first node that indicates a first preconfigured resource allocation of the plurality of preconfigured resource allocations is to be used for initial communications with one or more of the other nodes.

20. The method of claim 19, wherein the first preconfigured resource allocation is a default resource allocation that is provided in configuration information that is provided to the first node.

21. The method of claim 19, further comprising:
determining that a second preconfigured resource allocation is to be used for further communications with one or more of the other nodes;
providing an indication to the first node to change to the second preconfigured resource allocation; and
receiving an indication of acknowledgment from the first node.

22. The method of claim 21, wherein the determining that the second preconfigured resource allocation is to be used for the further communications with one or more of the other nodes is based at least in part on the one or more preconfigured criteria for switching preconfigured resource allocations.

23. The method of claim 22, wherein the one or more preconfigured criteria are based at least in part on the beam that is used for communications with one or more of the other nodes, and wherein the first preconfigured resource allocation is associated with a first beam and the second preconfigured resource allocation is associated with a second beam.

24. The method of claim 22, wherein the first preconfigured resource allocation and the second preconfigured resource allocation are associated with one or more of:
different multiplexing parameters of beams used for communications with one or more of the other nodes,
the power saving mode that is used for communications with one or more of the other nodes,
a topological state of at least one of the first node or one or more of the other nodes,
the quality of service associated with communications between the first node and one or more of the other nodes,
or any combinations thereof.

25. The method of claim 18, further comprising:
receiving an indication from the first node that a second preconfigured resource allocation of the plurality of preconfigured resource allocations is to be used for further communications with one or more of the other nodes.

26. An apparatus for wireless communication, comprising:
a processor,
memory coupled with the processor; and
instructions stored in the memory and executable by the processor to cause the apparatus to:
identify, at a first node of a multiple-hop wireless network, a first preconfigured resource allocation of a plurality of preconfigured resource allocations of wireless resources that are available for communications between the first node and one or more of a parent node or a child node, wherein the first node is a relay node in the multiple-hop wireless network;
select, at the first node after using the first preconfigured resource allocation, a second preconfigured resource allocation of the plurality of preconfigured resource allocations for communications with one or more of the parent node or the child node, wherein the second preconfigured resource allocation is selected by the first node for one or more communications with one or more of the parent node or the child node based at least in part on one or more preconfigured criteria for switching preconfigured resource allocations, the one or more preconfigured criteria including one or more of a beam that is used for communications between the first node and one or more of the parent node or the child node, a power saving mode that is used for communications between the first node and one or more of the parent node or the child node, or a quality of service associated with communications between the first node and one or more of the parent node or the child node; and
communicate with one or more of the parent node or the child node using the second preconfigured resource allocation.

27. The apparatus of claim 26, wherein the instructions are further executable to cause the apparatus to:
receive, from a central entity of the multiple-hop wireless network, configuration information that indicates each of the plurality of preconfigured resource allocations that are available to the first node for communications with one or more parent nodes or child nodes; and
receive, from the central entity, an initial configuration that indicates the first preconfigured resource allocation is to be used for initial communications with one or more of the parent node or the child node.

28. The apparatus of claim 27, wherein the selection of the second preconfigured resource allocation is based at least in part on receiving, from a central entity of the multiple-hop wireless network, an indication to change to the second preconfigured resource allocation.

29. An apparatus for wireless communication, comprising:
a processor,
memory coupled with the processor; and
instructions stored in the memory and executable by the processor to cause the apparatus to:
configure, by a central entity of a multiple-hop wireless network, a first node of the multiple-hop wireless network with a plurality of preconfigured resource allocations, wherein the first node is a relay node in the multiple-hop wireless network and each of the plurality of preconfigured resource allocations indicates different wireless resources that are available for communications between the first node and one or more of other nodes, and wherein a preconfigured resource allocation of the plurality of preconfigured resource allocations is selected by the first node for one or more communications with the one or more other nodes based at least in part on one or more preconfigured criteria for switching preconfigured resource allocations, the one or more preconfigured criteria including one or more of a beam that is used for communications between the first node and the one or more other nodes, a power saving mode that is used for communications between the first node and the one or more other nodes, or a quality of service associated with communications between the first node and the one or more other nodes; and provide the first node with the plurality of preconfigured resource allocations.

30. The apparatus of claim 29, wherein the instructions are further executable to cause the apparatus to:

provide an initial configuration to the first node that indicates a first preconfigured resource allocation of the plurality of preconfigured resource allocations is to be used for initial communications with one or more of the other nodes;

determine that a second preconfigured resource allocation is to be used for the further communications with one or more of the other nodes;

provide an indication to the first node to change to the second preconfigured resource allocation; and receive an indication of acknowledgment from the first node.

* * * * *